United States Patent
Kalpio et al.

(10) Patent No.: US 12,496,769 B2
(45) Date of Patent: Dec. 16, 2025

(54) SYSTEM AND METHOD FOR PERFORMING QUALITY ANALYSIS FOR MULTIDIMENSIONAL PRINTING

(71) Applicant: Brinter Oy, Turku (FI)

(72) Inventors: Tomi Kalpio, Turku (FI); Marko Piira, Halikko (FI)

(73) Assignee: Brinter Oy, Turku (FI)

(*) Notice: Subject to any disclaimer, the term of this patent is extended or adjusted under 35 U.S.C. 154(b) by 0 days.

(21) Appl. No.: 17/480,887

(22) Filed: Sep. 21, 2021

(65) Prior Publication Data

US 2023/0091230 A1   Mar. 23, 2023

(51) Int. Cl.
| | | |
|---|---|---|
| *B29C 64/112* | (2017.01) | |
| *B29C 64/124* | (2017.01) | |
| *B29C 64/393* | (2017.01) | |
| *B29C 64/118* | (2017.01) | |
| *B33Y 50/00* | (2015.01) | |
| *B33Y 50/02* | (2015.01) | |

(52) U.S. Cl.
CPC .......... *B29C 64/112* (2017.08); *B29C 64/124* (2017.08); *B29C 64/393* (2017.08); *B29C 64/118* (2017.08); *B33Y 50/00* (2014.12); *B33Y 50/02* (2014.12)

(58) Field of Classification Search
CPC ......... B29C 64/118; B29C 64/386–393; B29C 64/112; B29C 64/245; B33Y 50/00; B33Y 50/02
See application file for complete search history.

(56) References Cited

U.S. PATENT DOCUMENTS

| | | | |
|---|---|---|---|
| 2006/0111807 A1* | 5/2006 | Gothait | B29C 64/393 700/119 |
| 2017/0028646 A1* | 2/2017 | Sun | B33Y 99/00 |
| 2018/0095450 A1* | 4/2018 | Lappas | G06T 19/00 |

(Continued)

FOREIGN PATENT DOCUMENTS

| | | |
|---|---|---|
| EP | 3359372 B1 | 6/2019 |
| WO | 2017108071 A1 | 6/2017 |

(Continued)

OTHER PUBLICATIONS

The International Search Report and Written Opinion, European Patent Office, Application No. PCT/FI2022/050553, mailed Nov. 11, 2022, 17 pages.

*Primary Examiner* — Andrew L Swanson
(74) *Attorney, Agent, or Firm* — BakerHostetler

(57) ABSTRACT

A system for performing quality analysis for multidimensional printing. The system includes a multidimensional printer, wherein the multidimensional printer comprises a printing head, a printing surface, an axis system and a scale, wherein the scale is arranged to measure weight applied on the printing surface; and a control unit operatively coupled to the multidimensional printer. The control unit is configured to control the printing head to extrude a printing material, to produce a printed object on the printing surface, obtain, from the scale, a weight of the printed object, and store the weight of the printed object in a memory associated with the control unit, compare the weight with a reference weight of the printed object, and control the printing head to stop extrusion of the printing material when the weight is equal to or exceeds the reference weight.

8 Claims, 4 Drawing Sheets

(56) References Cited

U.S. PATENT DOCUMENTS

| | | | | |
|---|---|---|---|---|
| 2018/0345563 A1* | 12/2018 | Sternå | .................... | B33Y 40/00 |
| 2019/0275737 A1* | 9/2019 | Hsiao | ...................... | B29C 64/20 |
| 2021/0154941 A1* | 5/2021 | Kobayashi | ............ | B29C 64/209 |
| 2022/0161499 A1* | 5/2022 | AbuShall | ............... | B29C 64/112 |
| 2022/0324177 A1* | 10/2022 | Debora | ................. | B29C 64/245 |
| 2023/0092285 A1* | 3/2023 | Basit | ....................... | A61J 3/005 |

FOREIGN PATENT DOCUMENTS

| | | |
|---|---|---|
| WO | 2021160999 A1 | 8/2021 |
| WO | 2022194682 A1 | 9/2022 |

* cited by examiner

SYSTEM AND METHOD FOR PERFORMING QUALITY ANALYSIS FOR MULTIDIMENSIONAL PRINTING

TECHNICAL FIELD

The present disclosure relates generally to multidimensional printing; and more specifically, to systems for performing quality analysis for multidimensional printing. The present disclosure also relates to methods of performing quality analysis for multidimensional printing using the aforementioned systems.

BACKGROUND

Multidimensional printing is increasingly becoming a part of the wider manufacturing ecosystem. Currently, three-dimensional (3D) printing, a type of multidimensional printing, is the most popular printing process. The 3D printing process typically employs adding successive layers of a printing material under computer control to create a 3D printed object by using rapid prototyping technology and/or additive manufacturing technology, for example. Normally, the 3D printing process finds application in the fields of architecture, engineering and construction (AEC), industrial designs, automotive, aerospace, military, geographic information systems, medicine and biomedical constructs and engineering, biotechnology (human tissue replacement), fashion (including, but not limited to, footwear, jewelry, eyewear), food (such as artificial meat), and so forth.

Notably, the 3D printing process increases the industrial productivity by reducing overall production time. However, conventional 3D printing processes fail to accurately customize a plurality of parameters that are required for (and during) the printing process. Said inaccurate customization could be due to lack of proper calibration systems associated with the conventional 3D printing process. Moreover, the lack of proper calibration systems further leads to the creation of printed objects that could be of undesired quality (for example dimensions, composition, and so on). It will be appreciated that such printed objects fail to pass the desired quality control check and are eventually rejected. Thus, transforming said 3D printing process from a highly productive to an unsustainable process.

Recent advances in 3D printing have introduced means for calibration of conventional 3D printing devices. Typically, such means for calibration include external devices, such as sensors. However, the external devices allow for calibrations either at the beginning or at the end of the printing process. For example, the printing material and the printed object could be calibrated, using the external devices, at the start and at the end of the printing process, respectively. It will be appreciated that a plurality of sensors is normally used, thereby, increasing the overall cost of the 3D printing process. Moreover, the conventional 3D printing devices are configured for printing objects on printing surfaces of even flatness only and fail to print on printing surfaces of uneven flatness due to ineffective calibration thereof, such as during the printing process. Furthermore, ineffective calibrations may limit the use of such conventional 3D printing devices in applications such as bioprinting and/or pharma printing that demands hyper-accurate quality results.

Therefore, in light of foregoing discussion, there exists a need of an improved multidimensional printing process and improved means for calibration thereof.

SUMMARY

The present disclosure seeks to provide a system for performing quality analysis for multidimensional printing. The present disclosure also seeks to provide a method for performing quality analysis for multidimensional printing. The present disclosure seeks to provide a solution to the existing problems related to the quality of the final product obtained by multidimensional printing. An aim of the present disclosure is to provide a solution that overcomes at least partially the problems encountered in prior art.

In one aspect, an embodiment of the present disclosure provides a system for performing quality analysis for multidimensional printing, the system comprising:
  a multidimensional printer, wherein the multidimensional printer comprises a printing head, a printing surface, an axis system and a scale, wherein the scale is arranged to measure weight applied on the printing surface; and
  a control unit operatively coupled to the multidimensional printer, wherein the control unit is configured to:
    control the printing head to extrude a printing material, to produce a printed object on the printing surface,
    obtain, from the scale, a weight of the printed object, and store the weight of the printed object in a memory associated with the control unit,
    compare the weight with a reference weight of the printed object, and
    control the printing head to stop extrusion of the printing material when the weight is equal to or exceeds the reference weight.

In another aspect, an embodiment of the present disclosure provides a method for performing quality analysis for multidimensional printing, the method comprising:
  setting up a multidimensional printer, wherein the multidimensional printer comprises a printing head, a printing surface, an axis system and a scale, wherein the scale is arranged to measure weight applied on the printing surface;
  defining, in a control unit, a set of parameters for performing quality analysis for multidimensional printing, wherein the control unit is operatively coupled to the multidimensional printer; and
  operating the control unit, based on the set of parameters, for
    controlling the printing head to extrude a printing material, to produce a printed object on the printing surface,
    obtaining, from the scale, a weight of the printed object, and storing the weight of the printed object in a memory associated with the control unit,
    comparing the weight with a reference weight of the printed object, and
    controlling the printing head to stop extrusion of the printing material when the weight is equal to or exceeds the reference weight.

Embodiments of the present disclosure substantially eliminate or at least partially address the aforementioned problems in the prior art, and provides an efficient system and an improved method of calibration for multidimensional printing. Beneficially, the system and method provide an improved quality analysis of the final product of the multidimensional printing, thereby preventing wastage of resources and time required in the production line.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
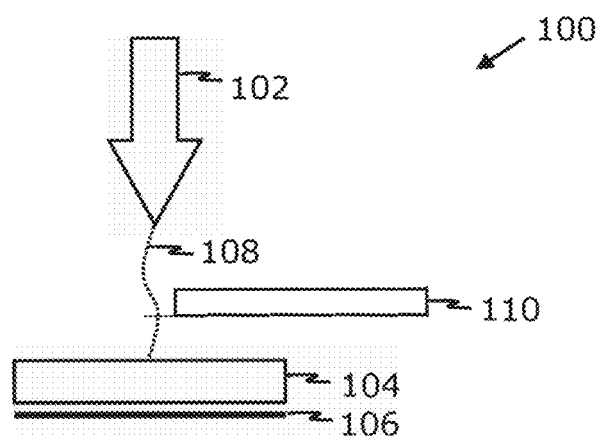
FIG. 1 is a schematic illustration of a system for performing quality analysis for multidimensional printing, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for performing quality analysis for multidimensional printing, the system comprising:
a multidimensional printer, wherein the multidimensional printer comprises a printing head, a printing surface, an axis system and a scale, wherein the scale is arranged to measure weight applied on the printing surface; and
a control unit operatively coupled to the multidimensional printer, wherein the control unit is configured to:
control the printing head to extrude a printing material, to produce a printed object on the printing surface,
obtain, from the scale, a weight of the printed object, and store the weight of the printed object in a memory associated with the control unit,
compare the weight with a reference weight of the printed object, and
control the printing head to stop extrusion of the printing material when the weight is equal to or exceeds the reference weight.

In another aspect, an embodiment of the present disclosure provides a method for performing quality analysis for multidimensional printing, the method comprising:
setting up a multidimensional printer, wherein the multidimensional printer comprises a printing head, a printing surface, an axis system and a scale, wherein the scale is arranged to measure weight applied on the printing surface;
defining, in a control unit, a set of parameters for performing quality analysis for multidimensional printing, wherein the control unit is operatively coupled to the multidimensional printer; and
operating the control unit, based on the set of parameters, for
controlling the printing head to extrude a printing material, to produce a printed object on the printing surface,
obtaining, from the scale, a weight of the printed object, and storing the weight of the printed object in a memory associated with the control unit,
comparing the weight with a reference weight of the printed object, and
controlling the printing head to stop extrusion of the printing material when the weight is equal to or exceeds the reference weight.

The present disclosure provides the aforementioned system and the aforementioned method for performing quality analysis for multidimensional printing. The system employs the scale for calibrating the other component of the multidimensional printer and for measuring different types of weights thereon before, during and after the multidimensional printing process. Beneficially, the system and method enable producing a final product, namely the printed object, of a desired quality. In this regard, the system and method functions based on the defined set of parameters. Moreover, an efficient calibration of the system enables a cost-effective production line with no or negligible wastage of resources and time.

Pursuant to embodiments of the present disclosure, the system and the method provided herein are used for performing quality analysis for multidimensional printing. The term "multidimensional printing" as used herein refers to a process of creating or manufacturing an object (namely, the printed object), physically or virtually having multidimensions. The multidimensional printing is typically based on a multidimensional digital model of the object. The multidimensional printing includes, but is not limited to, one-dimensional (1D), two-dimensional (2D), three-dimensional (3D), four-dimensional (4D), five-dimensional (5D), six-dimensional (6D) printing, and so forth. The term "printed object" as used herein refers to the object of a desired quality produced as a result of the multidimensional printing. Moreover, the printed object may be a 1D, 2D, 3D, 4D, 5D, 6D, and so forth. Furthermore, the printed object may have a specific shape, size, weight, and so forth, depending upon the multidimensional digital model thereof.

Optionally, the multidimensional printing may be a 3D printing. The 3D printing typically uses a variety of technologies (such as additive manufacturing technology, and so forth), processes (such as inkjet 3D printing, and so forth), equipment (a printer having a single or multiple printing heads for extruding the printing material therefrom), and the printing materials (such as a bioink, drug, plastic, a metal, and so forth) for manufacturing a three-dimensional printed object. Optionally 3d printing can also use other than layer by layer method. Optionally, other technologies, such as Vat Photopolymerization, Powder Bed Fusion, Material Extrusion, Material Jetting, Binder Jetting, Direct Energy Deposition, and the like, may be used for 3D printing depending upon the process and the type of printing material used therefor.

Optionally, the multidimensional printing is based on the additive manufacturing technology. The term "additive manufacturing technology" refers to a technologies that manufacture 3D printed objects by employing data from computer-aided-design (CAD) software, or a three-dimensional (3D) object scanner to direct hardware (such as multidimensional printer working on principles of additive manufacturing) to deposit the printing material, layer-upon-layer, in precise geometric shapes. Notably, the additive manufacturing involves addition or deposition of thousands of minuscule layers of the printing material (such as metal powder, thermoplastics, ceramics, composites, glass, edibles and so forth) that are combined to create the printed object.

Throughout the present disclosure, the term "quality analysis" as used herein refers to a way of ensuring (by means of monitoring and controlling the process of multidimensional printing) a desired quality of the printed object. It will be appreciated that the quality analysis of the multidimensional printing may be performed throughout the process, such as pre-defined intervals (based on time, size of the printed object, change in printing material, and so on) or in real-time. Optionally, quality analysis may include efficient calibration of the system components, weight and flow rate of the printing material, and so forth. Optionally, quality analysis may include ensuring, for example that all the system components work in conjugation with each other to eventually ensure that the amount of the printing material extruded from the printing head to print the printed object on the printing surface matches with a defined set of parameters and produces the desired quality of printed object. Moreover, quality analysis can be used to monitor rapid changes of the weight and/or flow speed of the printed material indicating for example a change in viscosity, density, a number of particles, or a size of particles of the printed material. In an example, the quality analysis ensures measuring the number of cells inside a mass (namely, the printed object) or gel (namely, the printing material). In such case, the total volume of the mass or gel is important, but for example in a tissue or a drug, and so forth, the number of cells in the mass or gel or the amount of drug, and so forth. is an important aspect of quality analysis.

The term "multidimensional printer" as used herein refers to a printing device that creates a multidimensional object by forming one layer thereof at a time, based on the multidimensional digital model of the object. Moreover, the multidimensional digital model is typically a software file that comprises details corresponding to the desired printed object. Such details of the printed object include, but do not limit to, a shape, a weight, a density, a fabrication material, a composition, ratio of individual components. In this regard, the multidimensional printer may be selected based on the desired printed object. For example, a multidimensional printer having three printing heads may be selected to produce a printed object comprising three constituents of varying colors. It may be appreciated that a variety of multidimensional printers exist and are known to a person skilled in the art, and thus has not been described in detail herein for the brevity of the present disclosure.

Throughout the present disclosure, the term "printing head" as used herein refers to a component of the multidimensional printer used for extruding the printing material, to produce the printed object on the printing surface. In other words, the printing head is configured to dispense the printing material that is being used for the manufacturing of the printed object. The printing head may for example be implemented to have a syringe-like structure. The printing head enables extrusion of the printing material in a controlled manner, such that the printing head extrudes a certain amount of printing material therefrom. Optionally, the printing head comprises a container for containing the printing material and a nozzle for extruding the printing material therefrom. Moreover, the nozzle may have a wide range of cross-section, such as diameter, and shape. It will be appreciated that the diameter of the nozzle has a great effect on an extrusion pressure required for a continuous printing material flow (namely, extrusion). Moreover, the shape of the nozzle determines the texture (namely, surface finish) of the printed object. In an example, the nozzle with a small diameter and square shape extrudes the printing material as thin cuboidal filaments. In another example, the nozzle with a larger diameter and round shape extrudes the printing material as thick cylindrical filaments. It will be appreciated that the smaller diameter of the nozzle affects the printing material flow rate, and therefore slows down the printing speed. Optionally, the printing head is coupled to a heating or cooling block that maintains a pre-defined temperature for the printing material. Optionally, the heating block heats the printing material just above its melting point to enable continuous extrusion during printing, still avoiding unnecessary oozing while not printing. Optionally, the printing material may get energy from an external source, in an example a laser, UV, blue light and so forth. Optionally, the cooling block cools the printing material for example in case when some materials are solid at a room temperature and below a certain temperature they become fluid to enable continuous extrusion during printing. Optionally, the heating and/or cooling block may be arranged near the nozzle.

In an embodiment, the multidimensional printer may comprise more than one printing heads. Moreover, the printing heads of the multidimensional printer may be of different sizes and may be employed to dispense different printing materials from each of the printing heads. Furthermore, the printing heads are configured to dispense different materials to manufacture a single printed object. Optionally, different printing materials may either have different chemical compositions or a same chemical composition but with different density, volume, texture, and/or a color thereof. In an example, the multidimensional printer may have three printing heads, wherein each of the three printing heads contains a similar or totally different printing material, such as Acrylonitrile Butadiene Styrene (ABS) plastic, differing only in terms of color due to different pigments or dyes added thereto in different printing heads. In another example, the multidimensional printer may have three printing heads, wherein each of the three printing heads contains a totally different printing material, such as liquid, gel type and solid materials. In an example, the printing material being dispensed from the printer heads may be in a powder form, in a liquid form, in a form of a wire, and so forth.

The term "printing material" as used herein refers to a material for manufacturing the printed object. The printing material being dispensed from the printing head may be in a powdered form, in a liquid form, in a form of a continuous filament, and so forth. Moreover, the printing material has pre-defined set of parameters. The set of parameters include, but do not limit to, a mass, a weight, a volume, a density and flow characteristics. It will be appreciated that the printing material may be required to undergo some physical changes before and/or during the extrusion thereof from the printing head. In an example, the printing material may be melted before or during extrusion or melted before and during extrusion or melted during extrusion thereof. In another example, the printing material may be mixed with a solvent to form a paste before extrusion thereof. The printing material may be a metal (such as titanium, steel, aluminum, copper, an alloy, superalloys, and so forth), a biological tissue, a composite base, continuous fiber filaments, ceramic, cement, and so forth.

The term "printing surface" as used herein refers to a base on which the extruded printing material manufactures the printed object. Optionally, the printing surface may be of various shapes and sizes. In this regard, the printing surface may have a specific shape, a cross-section, a degree of flatness and/or an angle with respect to a plane. Moreover, the printing surface is calibrated to determine the shape, the cross-section, the degree of flatness and the angle. Optionally, the printing surface is detachable from the system and enables easy withdrawal of the printed object. Optionally, the printing surface is a conveyor unit that comprises a conveyor belt or a palette on top of the conveyor belt over which the printed object is manufactured during operation of the system. The conveyor belt rotates, thereby providing the horizontal movement to the printing surface for an automated withdrawal of the printed object. Optionally the printing surface can move along three axes, i.e. an x-axis (sideways (i.e. left and right direction) relative to the printing head), a y-axis (back and forth direction relative to the printing head), and a z-axis (up and down direction relative to the printing head). Optionally, the printing surface is coupled to a movement mechanism that enables the movement of the printing surface with respect to the movement of the printing head. Optionally, the movement mechanism may be arranged (namely, accommodated) below the printing surface. Optionally, the movement mechanism enables a horizontal movement (along x-axis as well as y-axis) of the printing surface and a vertical movement (along z-axis) of the printing surface. Optionally, the horizontal movement of the printing surface may be achieved by the conveyor unit type implementation of the printing surface. Therefore, the movement mechanism further comprises a lift unit that provides vertical movement of the printing surface. Optionally, the lift unit may be implemented using a piston-cylinder arrangement, wherein the piston is coupled to the printing surface, and enables movement of the printing surface up and down with respect to the cylinder.

The printing head may be operatively coupled to the axis system. The axis system is operable to enable movement of the printing head. In this regard, the printing head has one end thereof fixed to the axis system. Moreover, the axis system may comprise electrics and pneumatics therein, to enable the movement of the printing head. It will be appreciated that based on the multidimensions, the axis system could enable movement of the printing head along at multiple axes. In an example, for the 1D printing, the axis system could enable movement of the printing head along only one axis. In another example, for the 3D printing, the axis system could enable movement of the printing head along three axes, i.e. an x-axis (side to side (left and right) direction relative to the printing surface), a y-axis (back to forth direction relative to the printing surface), and a z-axis (up and down direction relative to the printing surface). Optionally, the x-axis, the y-axis and the z-axis are mutually perpendicular axes according to cartesian coordinate system. The mutually perpendicular axes enable movement of the printing head along three orthogonal directions. In such case, the printing head is configured to have at least three degrees of freedom. The printing head is configured to move linearly along at least three axes (i.e. the x-axis, the y-axis and the z-axis). Optionally, the printing head is configured to rotate about each of the three axes, thus resulting in six degrees of freedom for the printing head. Alternatively, the overall movement of the printing head during multidimensional printing can be a diagonal position besides a 1D, 2D, 3D movement thereof. In this regard, the printing head may move in any other direction, besides the left and right, back and forth, and up and down directions, such as in a diagonal direction. Moving diagonally upward and forward implies moving in a linear combination of up and forward directions.

Optionally, the movement mechanism as well as the axis system are operably coupled to respectively control the movements of the printing surface and the printing head(s). In an exemplary implementation, the movement mechanism (comprising the conveyor unit and the lift unit) enables movement of the printing surface in at least one axis. In an example, the movement mechanism enables movement of the printing surface in only one axis, i.e. x, y or z axis, while the axis system is configured to control the printing head to move along two axes, i.e. y and z axis, x and z axis, or x and y axis, respectively. In another example, the movement mechanism enables movement of the printing surface in two axes, i.e. x and y axis, y and z axis, or x and z axis, while the axis system is configured to control the printing head to move along only one axis, i.e. z, x or y axis, respectively. In another example, the movement mechanism enables movement of the printing surface along all the three axes, i.e. x, y and z axis, while the axis system is configured to control the printing head to be stationary. In another exemplary implementation, the movement of the printing surface is restricted (i.e. stationary), while the axis system is configured to control the printing head to move along all the three axes, i.e. x, y and z axis.

Alternatively, optionally, the axis system is operable to enable movement of the printing head and/or printing surface in case the printing surface is also moving during the printing process.

The term "scale" as used herein refers to a device for measuring a weight or a mass. It will be appreciated that the scale may measure the weight rather than the mass, but in a given gravitational field (such as the Earth's gravity), the weight of an object is proportional to the mass thereof. Typically, the scale reads in units of mass, such as kilograms, grams, milligrams, and so on. Optionally, some scales could be calibrated to read in units of force, such as newtons. In this regard, the scale measures the force needed to counter the mass being measured. Optionally, the scale may be implemented as an electronic analytical scale having a flat pan-like structure.

Optionally, the scale such as a weighing scale may be arranged below the printing surface for measuring different weights during the multidimensional printing. In an embodiment, the scale may be integrated with the printing surface. Beneficially, arranging the scale below the printing surface (or as a part of the printing surface) enables real-time process and quality control before, during and/or after printing process. Additionally, beneficially, the arrangement of scale as in the present disclosure eliminates the need for one or more sensors, thereby reducing the overall cost of the system.

It will be appreciated that the multidimensional printer may be implemented as an open arrangement or a closed arrangement. The closed arrangement is typically a housing that provides a printing area to accommodate the printing head, the printing surface, the axis system and the scale therein, wherein the housing forms a hermetically sealed chamber. Optionally, the housing can be implemented to have a substantially cuboidal shape having two side faces joining a top face and a bottom face of the housing. In an embodiment, the printing head and the axis system is received from an opening on the top face of the housing and the printing surface and the scale are received on the bottom face of the housing. Optionally, where the printing surface is implemented as a conveyor unit, each of two side faces of the housing has a slot therein, to enable the accommodation of the printing surface within the housing. In this regard, the housing provides access to the printing area via one or more openings therein. Moreover, the hermitically sealed chamber is essential to create controlled environmental conditions inside the housing of the multidimensional printer (such as a pre-defined temperature, pressure, humidity, air quality, and so forth). It will be appreciated that a width of the slots on the two side faces of the housing is substantially the same as a width of the printing surface, thereby enabling the hermetic sealing of the housing. Alternatively, the housing can be implemented to have a substantially cylindrical shape or any polygonal shape having a top face and a bottom face of the housing and a side wall joining the top face and the bottom face. In such embodiment, the printing head and the axis system is received from an opening on the top face of the housing and the printing surface and the scale are received on the bottom face of the housing, and the side wall may comprise one or more slots to enable the accommodation of the printing surface within the housing. The closed system may be suitable for a bioprocess, such as manufacturing an organ or organism, that require sterile conditions as ensured by the hermetically sealed chamber. The open system may be suitable for manufacturing big-size printed objects, such as houses at a construction site or an automobile in an assembly line. Optionally the open system may be assembled in a sterile environment making it suitable for a bioprocess, such as manufacturing an organ or organism, that require sterile conditions.

Moreover, the system comprises the control unit operatively coupled to the multidimensional printer. As used herein, the term "control unit" refers to the software and/or hardware in system that is operable to implement specific algorithms therein. Typically, the control unit is associated with performing operations such as starting the printing process, ending the printing process, controlling an amount of printing material to be extruded from the printing head, and so forth. Moreover, the control unit employs a processor configured to perform the abovementioned operations. It will be appreciated that optionally the processor includes, but is not limited to, a microprocessor, a microcontroller, a complex instruction set computing (CISC) microprocessor, a reduced instruction set computer (RISC) microprocessor, a very long instruction word (VLIW) microprocessor, or any other type of processing circuit. Furthermore, the term "processor" may refer to one or more individual processors, processing devices and various elements associated with the control unit. Additionally, the one or more individual processors, processing devices and elements are arranged in various architectures for responding to and processing the instructions that drive the system (such as the multidimensional printer).

Furthermore, the control unit is configured to store information associated with system components and the desired printed object. Optionally, the store information includes, for example, pre-defined set of parameters of the printing material including, but not limited to, a density, a volume, a mass or weight and a flow rate thereof; information corresponding to the printed surface including, but not limited to, a length, width and height thereof, a surface finish thereof, an angular orientation thereof with respect to the plane; information corresponding to the printed object including, but not limit to, a shape, the weight, the density, the printing material, the composition and ratio of individual components thereof; and so forth. Optionally, the said information may be saved to a software file based on which the multidimensional printing is performed in order to achieve the printed object of a desired quality. Moreover, the control unit is configured to store the said information in the memory associated therewith. Herein, the term "memory" refers to a device or a system that is used to store information for immediate use in a hardware, software, electronic devices, and the like. Optionally the memory may be an in-built memory of the system (such as read-only memory (ROM), random access memory (RAM), and the like) or a memory on a remote server.

The term "weight" as used herein refers to a force exerted on a body by the gravity. Typically, the weight is measured mathematically as a product of mass of a body and the gravitational force on the body. Specifically, the weight measured here may be the weight of the body, that is implemented as the printing head (calculated before and during the multidimensional printing process), the printing surface (calculated before the multidimensional printing process), the printing material (calculated before and during the multidimensional printing process), and/or the printed object (calculated during and after the multidimensional printing process). Optionally, the weight of the printing head could be the pressure exerted by the printing head on the printing surface before, during or after the multidimensional printing process.

Optionally, the weight of the printed object could be any one of: a temporal weight of the printed object as measured in real-time or after the pre-defined intervals during the multidimensional printing process, a desired weight of the printed object as measured after the multidimensional printing process, or the reference weight of the printed object as provided to the control unit before the multidimensional printing process measured. It will be appreciated that the reference weight of the printed object could be defined in the control unit, based on the pre-defined set of parameters associated with the printing material, as an expected weight in real-time or after the pre-defined intervals during the multidimensional printing, or as the expected weight at the end of the multidimensional printing.

The control unit is configured to control in general a distance, an angle, and a position of the printing head and the printing surface relative to each other. Moreover, the control unit is configured to control the printing head to extrude the printing material, to produce the printed object on the printing surface. As used herein, the term "extrude" refers to an act of pushing, expelling, dispensing or forcing a material through a die of a desired cross-section in order to create printed objects of fixed cross-sectional profile, shape or size, or in order to create printed objects inside another material that can act as a support material, catalyst, and condition. Moreover, the printing head is configured to dispense or extrude the printing material based on one or more details stored in the control unit to manufacture the desired printed object. Furthermore, the printing head is pre-loaded with pressure sufficient to have a good grip on the printing material contained therein in order to ensure the continuous flow of the printing material during printing.

Moreover, the control unit is configured to obtain, from the scale, the weight of the printed object, and store the weight of the printed object in the memory associated with the control unit. The term "weight of the printed object" as used herein refers to the weight of the printing material received (namely, reached or collected) on the printing surface. The printing material received on the printing surface is used for manufacturing of the printed object. Optionally, the weight of the printed object may be measured at various points during the multidimensional printing process, such as after the pre-defined interval or in real-time during the multidimensional printing, or at the end of the multidimensional printing. The pre-defined interval may typically correspond to a time-dependent interval, a change in size of the printed object in terms of a length, an area or a height attained thereby, and/or change in printing material if more than one printing material is dispensed by more than one printing heads during the multidimensional printing. Moreover, the weight of the printed object is weighed using the scale attached below the printing surface (or integrated with the printing surface). Moreover, the weight of the printed object may be measured using the scale in real-time or after the pre-defined intervals. Beneficially, measuring the weight of the printed object in real-time or after the pre-defined intervals prevents the weight of the printed object to exceed from the pre-defined weight thereof. Additionally, beneficially, measuring the weight of the printed object in real-time or after the pre-defined intervals ensures quality analysis of the multidimensional printing as well as that of the printed object resulting therefrom. Moreover, the measured weight of the printed object is saved on the memory associated with the control unit. It will be appreciated that storing the measured weights enables maintaining a log history that could be useful for monitoring the performance of various system components as well as the entire multidimensional printing process. Moreover, storing a plurality of weights (before and after comparing the measured weight with the reference weight) is beneficial when there are more than one printing materials being dispensed from the one or more printing heads for quality analysis purposes.

Furthermore, the control unit is configured to compare the weight with the reference weight of the printed object. As mentioned above, the term "reference weight of the printed object" refers to the weight of the printed object based on the pre-defined set of parameters stored in the memory that is required to print the printed object with the desired weight. Mathematically, the reference weight could be calculated as a product of the pre-defined density of the printing material and the pre-defined volume of the printing material. In this regard, the reference weight of the printed object used herein is calculated internally in the multidimensional printer, such as by the control unit. Alternatively, the reference weight is manually fed into the memory. Moreover, internal methods could be used for estimation purposes only. However, beneficially, the present disclosure employs the scale to validate the weight of the object and effectiveness of the disclosed multidimensional printing process. Consequently, the control unit is configured to observe a deviation (a difference) between the measured and the reference weights. In this regard, the weight measured using the scale is used by the control unit to compare it to the reference value and use the deviation in said values to improve the multidimensional printing process, such as by calibration of the one or more system components, or for indicating successful printing of the printed object with desired quality if no difference is observed in the reference weight and the measured weight thereof.

Furthermore, the control unit is configured to control the printing head to stop extrusion of the printing material when the weight is equal to or exceeds the reference weight. In this regard, the control unit, upon determination of a deviation in the measured and reference weights, is operable to correct the determined deviation in the measured weight of the printed object being manufactured to correspond with the reference weight thereof, or vice versa. Thereby, achieving the desired weight of the printed object being manufactured same as that of the reference weight thereof as received from the software file or the 3D CAD model. Alternatively, the control unit terminates the manufacturing of the printed object if the determined deviation is unsuccessfully corrected. The control unit terminates the manufacturing of the printed object being manufactured when the control unit is unable to correct the deviation in weight of the printed object in order to avoid faulty printed object from being manufactured. For example, the control unit records the volume of salt being dispensed from the printing head for manufacturing of a medicinal pill. If, for the medicinal pill, the measured weight of the salt exceeds the reference weight of the salt as determined from the software file or the 3D CAD model, the control unit is configured to achieve the desired weight by correcting at least one parameter from the pre-defined set of parameters of the salt being dispensed from the printing head. Moreover, if the control unit unsuccessfully corrects the weight of the salt being dispensed from the printing head, the control unit terminates the manufacturing of the medicinal pill.

Optionally, the control unit is configured to generate an alarm when the control unit terminates the multidimensional printing process. The alarm is configured to alert an operator about the termination of the multidimensional printing process. In an example, the alarm may comprise emitting an alarm signal in form of a loud noise or a visual representation such that one or more operators are able to observe the generated alarm signal. In another example, the one or more operators may receive a notification on their smartphones.

Optionally, the control unit is configured to create an error log comprising data associated with the determined deviation. The control unit records the data comprising the determined deviations associated with the weight of the printed object being manufactured. The error log created by the control unit is used by the operator to maintain a record of the multidimensional printing process.

Optionally, the control unit is configured to control the multidimensional printing process to print only a part of the printed object on the printing surface at a given time. In this regard, the control unit is configured to determine the volume of the printing material to be dispensed from the printing head. Moreover, the control unit determines the time period for which the printing material is dispensed from the printing head. For example, the printed object to be manufactured is composed of two different components. A first part of the printed object being composed of a first type of printing material, such as silicone, is printed at a time t1 as a first printing head dispenses the silicone therefrom, and a second part of the printed object being composed of a second type of printing material, such as conductive paste, is printed at a time t2 as a second printing head dispenses the conductive paste therefrom. In said example, the control unit is configured to control the multidimensional printing process to print the first part and/or second part of the printed object, wholly or in parts, on the printing surface to complete the multidimensional printing of the printed object.

The control unit is configured to calibrate one or more system components, such as the printing head, the printing surface, and the printing material, for performing quality analysis for multidimensional printing. The term "calibrate" refers to correlating readings of a given system component with pre-defined values therefor in order to ensure the component's accuracy. Optionally, the readings of the given system component may show a deviation from the pre-defined values due to various external factors. In this regard, the printing head, the printing surface and the printing material are calibrated before, during and after the multidimensional printing. Optionally, at the beginning of the multidimensional printing, the printing head is positioned in alignment with the printing surface to calibrate the printing head and the printing surface. Moreover, the printing material is calibrated before and during the multidimensional printing. Furthermore, the printing material is calibrated to check whether the volume of printing material being extruded from the printing head (in real-time or after the pre-defined intervals) is equal to the pre-defined volume for printing the printed object with desired quality and confirmed with the weight of the printed object (in real-time or after the pre-defined intervals) corresponding to the part of printed object produced on the printing surface. Beneficially, the calibration step is of utmost importance in the multidimensional printing process, especially in printing of pharmaceutical products such as medicinal pills or other high-quality products. Moreover, results of the calibration step may be used either to: correct the system components and the amounts of printing material and the printed object within respective tolerance limits, maintain a record of the determined deviations, and reject or accept the printed object.

Optionally, the control unit is further configured to:
control the axis system to move the printing head to be in contact with the printing surface, on at least one horizontal position;
obtain, from the scale, weight values during the movement of the printing head;
comparing the weight values to a pre-defined calibration value and when a given weight value is equal to a pre-defined calibration value, a corresponding vertical position of the printing head is calibrated as a zero-vertical position for the at least one horizontal position; and
store the zero-vertical position for the at least one horizontal position, in the memory.

In this regard, the axis system is configured to lower the printing head in a manner that a tip thereof touches the printing surface. Herein, the term "movement of the printing head" refers to a shift in position of the printing head in the printing area. Typically, the printing head is configured to move in a 3D space to create a 3D printed object. Specifically, any point in space, such as a 3D space can be the described by three coordinates, such as the x-axis, the y-axis and the z-axis that form the printing area. It will be appreciated that movement of the printing head along these three orthogonal axes, i.e. the x-axis, the y-axis and the z-axis, enables defining the printing area and specifically the printing surface.

The term "horizontal position" as used herein refers to a sideways representation of a position of the printing head with respect to a plane of the printing surface. Typically, the horizontal position is expressed as the position of the printing head along two axes, i.e. the x-axis and the y-axis, that gives an initial position of the printing head with respect to the plane of the printing surface. Moreover, the printing head is configured to move in a forward direction and a backward direction on the y-axis, and in a left direction and a right direction on the x-axis. It will be appreciated that one or more horizontal positions define the printing surface. Moreover, the printing head could be located at one horizontal position at a time. Having said that, it will be appreciated that during the multidimensional printing process, the printing head could be located on at least one horizontal position. Optionally, the printing surface can move along three axes, i.e. an x-axis (side to side (left and right) direction relative to the printing head), a y-axis (back to forth direction relative to the printing head), and a z-axis (up and down direction relative to the printing head) making possible to keep always a right angle and a right distance between the printing head and the printed object on the printing surface.

Furthermore, the printing surface may be a planar or a non-planar surface. The term "non-planar surface" refers to a surface having more than one single plane. Optionally, the non-planar surface has different levels of flatness, shape and angles, resulting in either a flat, curved or uneven printing surface. Therefore, the x, y and z coordinates will differ for each of the horizontal positions of the printing surface. Therefore, the axis system is operable to move, as in lower down vertically as well as parallel to the plane of the printing surface, in order to contact at least one of the horizontal positions on the printing surface. Optionally, the calibration of the printing surface is performed before the multidimensional printing process. In this regard, the calibration of the printing process defines the flatness, shape, size and angle of the printing surface.

It will be appreciated that the contact of the printing head and the at least one horizontal position on the printing surface enables calibration of the printing head and the printing surface such that the printing head identifies the starting point for extrusion of the printing material and as it moves along the at least one horizontal starts adding more printing material layer by layer to manufacture the printed object on the printing surface. Beneficially, the calibration of the printing head is necessary to identify the starting point for the multidimensional printing process, while calibration of the printing surface provides the information regarding the flatness, shape, size and angles of the printing surface. Additionally, beneficially, the calibration of the printing head and the printing surface ensures quality analysis for multidimensional printing. Moreover, the determined coordinates for the at least one horizontal position on the printing surface is stored in the memory for further use with the same surface, such that repeated calibrations are not needed for said surface.

It will be appreciated that as the printing head is lowered or moved to be in contact with the printing surface or vice versa, the printing head exerts a pressure on each of the at least one horizontal surface, and said pressure values are measured by the scale. It will be appreciated that the pressure values may be converted to corresponding weight values using suitable mathematical formula, such as weight of a body is a product between the pressure exerted by the body on a given area. Said weight values corresponding to the pressure exerted on each of the at least one horizontal surface is compared with the pre-defined calibration value. The pre-defined calibration value may be a user-input or system calculated value of the pressure exerted by the printing head on a surface, such as the printed surface. Moreover, when the scale has identified a pressure by the printing head, the movement of the printing head is stopped. It will be appreciated that if there is no deviation in a given weight value and the pre-defined calibration value, it is assumed that the printing head is efficiently calibrated for a given horizontal position. Moreover, when a given weight value is equal to the pre-defined calibration value, a corresponding vertical position of the printing head is calibrated and stored in the memory as a zero-vertical position for the at least one horizontal position.

The term "vertical position" as used herein refers to a lateral representation of a position of the printing head with respect to the plane of the printing surface. Typically, the vertical position is expressed as a perpendicular position of the printing head with respect to the plane of the printing surface. Moreover, the printing head is configured to move in an upward direction and a downward direction on a z-axis that is orthogonal (or perpendicular) to the x-axis and y-axis of the printing surface. It will be appreciated that one or more vertical positions define the height of the printing area withing which the printed object could be accommodated. Moreover, the term "zero-vertical position" refers to a position along the z-axis of the x, y, z coordinates of the plane of the printing surface, wherein the value of the z-axis is zero when the printing head is in contact with the printing surface, on at least one horizontal position. It will be appreciated, that the zero vertical position may have a non-zero value when a part of the printed object is manufactured and the printing head is positioned on at least one horizontal position, in the x, y, z coordinates, on the manufactured part of the printed object. In this regard, at this point the weight values at different intervals as well as the zero-vertical positions are stored in the memory for future use when the same printing surface is used for multidimensional printing later on. Furthermore, the movement of the printing head is stopped as soon as the scale has identified a pressure thereon.

It will be appreciated that the control unit may be configured to control the movement mechanism as well as the axis system to move the printing surface and the printing head to be in contact with each other. As mentioned above, in an exemplary implementation, the movement mechanism (comprising the conveyor unit and the lift unit) enables movement of the printing surface in at least one axis. In an example, the movement mechanism enables movement of the printing surface in only one axis, i.e. x, y or z axis, while the axis system is configured to control the printing head to move along two axes, i.e. y and z axis, x and z axis, or x and y axis, respectively. In another example, the movement mechanism enables movement of the printing surface in two axes, i.e. x and y axis, y and z axis, or x and z axis, while the axis system is configured to control the printing head to move along only one axis, i.e. z, x or y axis, respectively. In another example, the movement mechanism enables movement of the printing surface along all the three axes, i.e. x, y and z axis, while the axis system is configured to control the printing head to be stationary. In another exemplary implementation, the movement of the printing surface is restricted (i.e. stationary), while the axis system is configured to control the printing head to move along all the three axes, i.e. x, y and z axis.

It will be appreciated that the control unit is configured to define a printing path for completing the manufacturing of the object, based on the determined location of the printing head in the x, y, z coordinates. The term "printing path" refers to an optimized path followed by the printing head to dispense the printing material onto the printing surface to manufacture the printed object. Optionally, besides the determined location of the printing head in the x, y, z coordinates, the control unit is configured to define a printing path for completing the manufacturing of the object, based on the information provided to the control unit by for example a computer aided design (CAD) software employed for manufacturing the printed object. Specifically, the control unit is operable to acquire a 3D CAD model of a desired printed object (such as a tissue) used for manufacturing the desired printed object. Subsequently, the control unit is operable to generate the printing path for printing the desired printed object based on the determined location of the printing head in the x, y, z coordinates and the 3D CAD model of the desired printed object.

Optionally, the calibration of the printing head and the printing surface is performed every time a new printing head configured to extrude a new printing material is used for printing a part of the printed object or after the printing process when printing surface is changed or moved. In this regard, the calibration process as discussed above is repeated as required for the new printing head. Optionally, when the printed object is allowed to dry (namely, post-curing) for a pre-defined period of time, such as 5 mins, the system may be required to be re-calibrated. It will be appreciated that a reason for the same is that the printing material may shrink a little while drying, therefore, an additional extrusion may be required to result in the printed object with the desired weight. Optionally, the printing head is positioned in alignment with the printing surface for enabling calibration before, after, and during the multidimensional printing.

Optionally, the control unit is further configured to:
 select, using the software application, the printing material having a pre-defined density and a pre-defined volume;
 control the printing head to extrude the printing material, to produce a test printed object on the printing surface;
 obtain, from the scale, a test weight of the test printed object;
 calculate, based on the test weight and the pre-defined density, a test volume of the test printed object, and compare the test volume with the pre-defined volume; and
 when the test volume differs from the pre-defined volume, change at least one of: the pre-defined density, the pre-defined volume.

Herein, the term "software application" refers to an application program or a computer program designed for performing a specific task, such as multidimensional printing and/or storing information related to the multidimensional printing and the desired quality of the printed object. In an embodiment, the software application may be a multidimensional printing software for facilitating the printing of multidimensional objects by translating a 3D model into a comprehensible data. Subsequently, the translated data is decoded by the multidimensional printer to initiate the multidimensional printing of the printed object. Moreover, the software application may be a software file stored in the control unit. Furthermore, the software file contains data such as process parameters, pre-defined set of parameters, and so forth. Typically, the pre-defined set of parameters could be the data regarding the type of printing material, a pre-defined density of the printing material, a pre-defined volume of the printing material, flow speed, a desired weight of the printed object, and so forth. In an example, the multidimensional printing may use the Fused Filament Fabrication (FFF) technology. In such case, the printing starts with importing a CAD or any other suitable CAD file, Additive Manufacturing-file (AM), or a code or a numerical presentation of the digital model into the software application and then converting the 3D model into process parameters used for manufacturing the printed object. Optionally, the software file is generated in the control unit for the multidimensional printing.

As used herein, the terms "pre-defined density" and "pre-defined volume" memory, as provided by the operator of the system before the printing process or as calculated by the system (before or during the printing process). Moreover, the term "pre-defined density" as used herein refers to a mass of a unit volume of the printing material. The density is measured as kilogram per cubic meter ($kg/m^3$), gram per cubic meter ($g/cm^3$), and so forth. Furthermore, the term "pre-defined volume" as used herein refers to the amount space occupied by the printing material when contained inside the printing head. The volume is measured as the cubic meter ($m^3$) or cubic centimeter ($cm^3$), and so forth. It will be appreciated that control unit is configured to control the printing head to extrude the printing material, to produce a printed object on the printing surface, based on the reference weight of the printing material and the selected pre-defined density and pre-defined volume of the printing material.

In this regard, the control unit is configured to extrude a test amount of the printing material to produce the test printed object on the printing surface. Herein, the term "test-printed object" refers to a part of the printed object printed for the first time during the multidimensional printing in order to test the efficiency of the multidimensional printer and enable suitable calibration of the system as required. Specifically, the test printed object is produced as a test using a part of the pre-defined volume of the printing material, such as for example 1 ml, 5 ml, 10 ml, or 20 ml of the 20 ml pre-defined volume.

The term "test weight" as used herein, refers to weight of the test printed object which is measured using the scale and provided to the control unit for further processing. In this regard, the test weight and the pre-defined density of the printing material (or a test density of the test printed object) are used to calculate the test volume of the test printed object. Mathematically, the test volume is determined by dividing the test weight with the pre-defined density of the printing material. Moreover, the test volume is compared with the pre-defined volume of the printing material to assess the efficiency of extrusion by the printing head. When the test volume differs from the pre-defined volume, at least one of: the pre-defined density or the pre-defined volume is changed to calibrate the printing material. It will be appreciated that the pre-defined density may be lowered or increased in value to dilute or concentrate (or thicken) the printing material, and the pre-defined volume may be lowered or increased in value to obtain desired weight of the test printed object at a given interval. Optionally, the difference between the values of the test volume and the pre-defined volume may be used to calibrate the printing head, such as the cross-section of the nozzle of the printing head. In this regard, the cross-section of the nozzle may be ineffective in dispensing the test volume, such as due to its diameter or a kink therein. If there is no difference between the values of the test volume and the pre-defined volume, it is assumed that the printing material will be effectively extruded from the printing head. Beneficially, calibrating the printing material before the printing process ensures a smooth printing process as well as a quality printed object resulting as a result thereof.

Optionally, the control unit is further configured to:
control the printing head to extrude a first volume of the printing material, to produce a first part of the printed object on the printing surface;
obtain, from the scale, a first weight of the printed object comprising the first part thereof, at a real-time;
control the printing head to extrude a second volume of the printing material, to produce a second part of the printed object on the printing surface;
obtain, from the scale, a second weight of the printed object, wherein the second weight corresponds to weights of the first part and the second part, at a real-time; and
control the printing head to stop extrusion of the printing material when the second weight is equal to or exceeds the reference weight.

In this regard, different volumes, such as the first volume and the second volume, of the printing material could be used at different stages to obtain a quality-controlled printed object. The terms "first volume" and "second volume" as used herein refer to a starting and a subsequent volume of the printing material, respectively, required to form the first part and the second part of the printed object on the printing surface. It will be appreciated that the term "second volume" may refer to any subsequent number of volumes of the printing material that may be dispensed from the printing head. It will be appreciated that the terms "first" and "second" are only representative numbers, and may include a second, third, a fourth, a fifth, a sixth value, and so forth, such that the first value precedes the second value, the second value precedes the third value and so forth. It will be appreciated that, in this regard, during an iterative extrusion process, the second volume will become a temporal first volume for the third volume, and the third volume will become a temporal first volume for the fourth volume, and so forth. Optionally, the first volume could be for example 1 ml, 5 ml, 10 ml, 20 ml, and so forth) and the second volume could be for example 0.1 ml, 0.5 ml, 1 ml, 5 ml, 10 ml, and so forth). Notably, the first volume may be less than or equal to the pre-defined volume of the printing material. In such case, the second volume would be less than the pre-defined volume of the printing material or a zero value, respectively. In an example, if the pre-defined volume of the printing material is 20 ml, the first volume would be for example 5 ml, therefore, the second volume could be 15 ml (5 ml less than 20 ml) and could be extruded as a single dispense thereof or in multiple sets (4 in number) of for example 5 ml. Similarly, the weight of different parts, such as the first part and the second part, of the printed object could be referred to any number of weights (such as the second weight, a third weight (corresponding to the weights of the first part, the second part and a third part), and so forth, during said iterative extrusion process) that may be measured for different parts of the printed object. It will be appreciated that the end measurement of the second weight, that is equal to or exceeds the reference weight.

Moreover, the first part of the printed object has a first weight, and is obtained from the scale at a real-time. The term "real-time" refers to the time describing various operations in computing or other processes which measures response times within a specified time, usually a relatively short time. Additionally, a real-time process is generally one that happens in defined time steps and fast enough to affect the environment in which it occurs, such as inputs to a computing system. Beneficially, the real-time printing process control enables the comparison of the volume of printing material extruded with the pre-defined volume stored in the memory during the multidimensional printing and performing quality analysis for the multidimensional printing. Typically, such quality analysis is important in industries such as medicine, electronics, and the like. In an example, the real-time measurement of the first weight and the second weight could be performed at a very short time, such as in a range of millisecond to seconds. For example, the real-time measurement of the first weight and the second weight could be performed in every 1 second.

It will be appreciated that the second volume of the printing material is extruded in order to produce the second part of the printed object on the printing surface when the first part is not the desired printed object. Moreover, in this regard, the first part and the second part together form the second weight of the printed object. Furthermore, the second weight of the printed object corresponds to combined weight of the first part and the second part, as measured with the scale at a real-time. Furthermore, when the second weight is equal to or exceeds the reference weight the control unit controls the printing head to stop extrusion of the printing material. Beneficially, real-time measurement of the first weight and the second weight ensures negligible or zero wastage of the printing material and thus manufacturing the printed object with the desired quality.

Optionally, the control unit is further configured to:
control the printing head to extrude a first volume of the printing material, to produce a first part of the printed object on the printing surface;
obtain, from the scale, a first weight of the first part of the printed object, after a pre-defined interval; and
control the printing head to extrude a second volume of the printing material, to produce a second part of the printed object on the printing surface, when the first weight is less than the reference weight;
obtain, from the scale, a second weight of the printed object, after the pre-defined interval, wherein the second weight corresponds to weights of the first part and the second part; and
controlling the printing head to stop extrusion of the printing material when the second weight is equal to or exceeds the reference weight.

In this regard, the first volume and the second volume of the printing material is extruded in order to produce the first part and the second part of the printed object on the printing surface, respectively. The weight of the first part (the first weight) and a combined weight of the first part and the second part (the second weight) are measured with the scale after the pre-defined interval. The term "pre-defined interval" as used herein refers to a physical or temporal difference between two things. It will be appreciated that the extrusion of the printing material may be paused during such pre-defined intervals. Herein, optionally, the pre-defined interval could be a time-specific interval, a material specific interval such as during change of printing material from a first type to a second type, a distance specific interval such as during shift of the printing head from a point A to a point B, or a layer change specific interval such as during movement of the printing head by one layer up. In an example, the measurement of the first weight and the second weight could be performed at a given pre-defined interval, such as in a range of milliseconds (ms) to a few seconds (or minutes). The pre-defined intervals may be for example, 100, 200, 300, 400, 500, 600, 700, 800 or 900 ms up to 1, 5, 10, 20, 40 or 60 s, and so forth. For example, the measurement of the first weight and the second weight could be performed at a pre-defined interval of 20 seconds. Furthermore, when the second weight is equal to or exceeds the reference weight, the control unit controls the printing head to stop extrusion of the printing material. Beneficially, the measurement of the first weight and the second weight after the pre-defined intervals ensures negligible or zero wastage of the printing material and thus manufacturing the printed object with the desired quality. Additionally, beneficially, measurements conducted after the pre-defined intervals saves a lot of computational power (cost and space) required for computing and storing the computed results in the memory.

Optionally, the control unit is further configured to:
control the printing head to extrude a first volume of the printing material, to produce a first part of the printed object on the printing surface, wherein the first volume is in a range between 66% and 99% of the pre-defined volume of the printing material;
obtain, from the scale, a first weight of the first part of the printed object, after a pre-defined interval;
determine whether or not the first weight is less than 95% of the reference weight;
when the first weight is less than 95% of the reference weight,
control the printing head to extrude a second volume of the printing material, to produce a second part of the printed object on the printing surface, and
obtain, from the scale, a second weight of the printed object, after the pre-defined interval, wherein the second weight corresponds to weights of the first part and the second part;
when the first weight is at least 95% of the reference weight,
control the printing head to extrude a second volume of the printing material, to produce a second part of the printed object on the printing surface, and
obtain, from the scale, a second weight of the printed object, in real-time, wherein the second weight corresponds to weights of the first part and the second part; and
control the printing head to stop extrusion of the printing material when the second weight is equal to or exceeds the reference weight.

In this regard, the first volume is a major portion, i.e. 66% to 99%, of the pre-defined volume of the printing material. In this regard, "66% to 99%" of the pre-defined printing material refers to the volume, in percentage, of the printing material printed in consecutive layers to produce a part of the printed object on the printing surface. It will be appreciated that the percentage value of the first volume may depend upon the type of printing material used for the multidimensional printing. In an example, the first volume is 95%.

Moreover, the first weight is measured by the scale and obtained by the control unit after the pre-defined interval. The first weight is compared with the first volume of the printing material to determine if the first weight is 95% of the reference weight. It will be appreciated that ideally 95% of the pre-defined volume of the printing material must result in 95% of the reference weight. If the first weight is less than 95% or at least 95% of the reference weight, the second volume of the printing material is extruded to produce the second part of the printed object. Moreover, very small volumes, such as the second volume, of the printing material are extruded and measured using the scale. Furthermore, the second weight is measured by the scale and obtained by the control unit after the pre-defined interval if the second weight is less than 95% of the reference weight or at a real-time if the second weight is at least 95% of the reference weight. Furthermore, when the second weight is equal to or exceeds the reference weight, the control unit controls the printing head to stop extrusion of the printing material, thereby ensuring desired quality of the printed object. It will be appreciated that the measurements after the pre-defined intervals as well as at the real-time during production ensures quality analysis for multidimensional printing as well as saving up on the computational power using mostly the pre-defined intervals for weight measurements. Specifically, the measurements at the pre-defined intervals ensure that lower amount of data points are collected for storing thereof in the memory yet ensuring that the printing material is not wasted, or the resultant product does not exceed the reference weight. More specifically, smaller volumes of the printing material may be dispensed towards the end of the printing process, such as from 95-100% of the second weight, to yield the desired quality of the printed object. Optionally, at this stage, the second weight may be calculated at the real-time with higher amount of data points.

Optionally, when the weight exceeds the reference weight, the control unit is further configured to control the printing head to retract an excess volume of the printing material from the printed object on the printing surface, in a manner that upon retraction, the weight is equal to the reference weight. The term "retract" as used herein refers to the recoil movement of the printing head in order to withdraw the excess printing material, extruded or dispensed therefrom, from the printed object on the printing surface. Beneficially, the process of retraction controls the excess of printing material in the printed object to achieve the printed objects with the desired quality. It will be appreciated that the excess printing material may deposit on an exterior surface of the printed object, or form threads between one or more parts of the printed object that may be printed at the same time. It may be appreciated that the printing head starts retracting the excess printing material when the volume of the printing material in the printed object exceeds the corresponding pre-defined volume stored in the memory. Moreover, the parameters that configure the retraction during the multidimensional printing may include adjusting a retraction distance, a retraction speed, z-axis elevation, and so forth.

Optionally, the system further comprises a flow meter communicably coupled to the control unit. Besides, the printing head, the printing surface, the axis system and the scale, the multidimensional printer may comprise some additional internal or external components that could be used in calibration and quality analysis purposes. For example, the external component may be a flow meter working in conjugation with the printing head, the scale, and others. The term "flow meter" as used herein refers to an instrument for measuring the flow (such as linear, nonlinear, volumetric or mass flow rate) of the fluid substance such as a liquid, a gas, paste, bioink, melted mass, particles, amount of cells and the like. Moreover, the flowmeter may be of various types based on the industrial applications, such as an obstruction type flow meter (differential pressure or variable area), an inferential flow meter (turbine type), an electro-magnetic flow meter, a positive-displacement flowmeter, a fluid dynamic (vortex shedding) flow meter, an anemometer flow meter, an ultrasonic flow meter, a mass flow meter, IR sensor and so forth. Typically, during the multidimensional printing of metal products, the mass flowmeter is used, which works on the basis of direct through flow measurement at a constant temperature. Furthermore, flow meter measures the speed of the printing material, thereby, giving an accurate value that can be used to control the printing head to extrude the printing material. Beneficially, the flow meter can be used as an additional tool for one-time, frequent or real-time calibration of one or more system components.

Moreover, optionally, the flow meter is configured to:
receive, from the control unit, a pre-defined density of the printing material, a pre-defined volume of the printing material, a pre-defined flow speed of the printing material and a pre-defined cross-sectional area of the printing head; and
measure a flow rate of the printing material that is being extruded with the printing head, to produce the printed object on the printing surface, wherein the flow rate is measured based on the pre-defined density, the pre-defined volume, the pre-defined flow speed and the pre-defined cross-sectional area.

In this regard, the control unit is operatively coupled to and controls operation of the flow meter, besides the printing head, the printing surface, the axis system and the scale. As used herein, the term "pre-defined flow speed" refers to the volume of the printing material passing through a cross-sectional area of the printing head, such as the nozzle thereof, and is stored in the memory before the multidimensional printing. The term "flow rate" as used herein refers to a flow speed of the printing material from the printing head per unit time. Mathematically, the flow rate may be calculated as the flow speed per unit time (i.e. dv/dt, wherein dv is the change in the pre-defined flow speed and dt is change in time to extrude) or as a product of the pre-defined density, the pre-defined flow speed, the area of cross-section with respect to time (i.e. D*A*v, wherein D is the pre-defined density, A is pre-defined area of cross-section, v is the pre-defined flow speed and dt is change in time), and expressed in units of meter cube per second ($m^3/s$). The flow meter typically calculates the flow rate, that may be used by the control unit to correlate with the pre-defined set of parameters for quality analysis. It will be appreciated that the scale can give a real measurement value for the weight of the printed object and the flow meter, used together with the scale, will increase accuracy about the information of the weight of the extruded printing material resulting in the printed object.

Optionally, the control unit is further configured to:
control the printing head to extrude, based on the flow rate, the printing material, to produce the printed object on the printing surface;
obtain, from the scale, the weight of the printed object;
calculate, based on the pre-defined density and the flow rate, a mass of the printing material that is extruded;
compare the mass with the weight; and
when the weight differs from the mass, change at least one of the pre-defined density, the pre-defined volume, the pre-defined flow speed, the pre-defined cross-sectional area.

It will be appreciated that the information received from the control unit, the weight or pressure measurements from the scale, and the flow rate measurements from the flow meter may be used for calibration and quality analysis. In this regard, the control unit calculates a mass of the printing material that is extruded using the pre-defined density and the flow rate. As used herein, the term "mass" refers to the quantity for measuring the resistance to acceleration by a body when a net force is applied thereon. In this regard, the mass may be the product of the pre-defined density and the pre-defined volume of the printing material, and expressed in units of kilogram (kg), gram (g), and the like. Optionally, the mass may be calculated as the product of the pre-defined density, the pre-defined flow speed of the printing material, pre-defined area of cross-section of the printing head and the time (i.e. D*A*v*t, wherein D is the pre-defined density, A is the pre-defined area of cross-section, v is the pre-defined flow speed and t is the time to extrude). The calculated mass is subsequently compared with the weight of the printed object, and at least one of the pre-defined density, the pre-defined volume, the pre-defined flow speed, the pre-defined cross-sectional area are changed when the weight differs from the mass. Optionally, the flow meter may be used to check flow rates of more than one printing heads containing similar or different types of printing material therein. In an example, the multidimensional printer comprises three printing heads comprising a 200 ml of compound A, a 100 ml of compound B, and a 100 ml of compound C, wherein each of the three compounds have same density and flow speed, and the area of cross-section of the three printing heads is also same. In said example, the mass of the resultant compound is determined as 400 mg, and can be confirmed or checked with the weight value obtained from the scale. Beneficially, the comparison of mass (determined using the stored information) and weight (as obtained from the scale) enables quality analysis of the multidimensional printing process. Additionally, beneficially, the said measurements could be used to calibrate at least one of: the flowmeter, one or more components of the multidimensional printer, such as the scale, the printing head, and so forth.

Optionally, the control unit is further configured to control the printing head to extrude, based on the pre-defined flow speed, the printing material, to produce the printed object on the printing surface, and the flow meter is configured to measure an actual flow speed of the printing material, at a real-time. It will be appreciated that it is an inherent function of the flow meter to measure the actual flow speed during printing. Moreover, the actual flow speed may be different from the pre-defined flow speed. Optionally, the difference may be due to a faulty printing head or an error in determining the pre-determined flow speed. Furthermore, said actual flow speed may be used for calibrating the printing material or the printing head, as discussed above. Optionally, the real-time measurement of the flow speed may be performed at every 1 second, for example. Beneficially, the real-time measurement of the flow speed prevents errors during the multidimensional printing process and collects a plurality of data points for further quality analysis purposes.

Optionally, the control unit may be configured to measure, using the scale, the weight of the printed object; calculate, based on the pre-defined flow speed, a mass flow rate of the printing material that is extruded, compare the mass flow rate with the flow rate; and change the pre-defined flow speed when the flow rate differs from the mass flow rate.

Optionally, the control unit is further configured to:
control the printing head to extrude, based on the pre-defined flow speed, a first volume of the printing material, to produce a first part of the printed object on the printing surface;
obtain from the flow meter, a first flow speed of the printing material, wherein the first flow speed is measured and obtained after a pre-defined time interval while the first part of the printed object is being produced;
control the printing head to extrude, based on the pre-defined flow speed, a second volume of the printing material, to produce a second part of the printed object on the printing surface;
obtain from the flow meter, a second flow speed of the printing material, wherein the second flow speed is measured and obtained after a pre-defined time interval while the second part of the printed object is being produced;
obtain, from the scale, a latest weight of the printed object;
compare the latest weight with an expected weight; and
when the latest weight differs from the expected weight, change at least one of: the pre-defined density, the pre-defined volume, the pre-defined flow speed, the pre-defined cross-sectional area.

The terms "first flow speed" and "second flow speed" as used herein refer to a starting (namely, initial) speed and a subsequent speed of flow of the printing material, respectively, through the printing head, for forming the first part and the second part of the printed object on the printing surface. It will be appreciated that the terms "first" and "second" are only representative numbers, and may include a third, a fourth, a fifth, a sixth value, and so forth, such that the first value precedes the second value, the second value precedes the third value and so forth. Optionally, the first flow speed could be more than the second flow speed. It will be appreciated that the term "second flow speed" may refer to any subsequent number of pre-defined flow speeds of the printing material that may be dispensed from the printing head. Similarly, the weight of different parts, such as the first part and the second part, of the printed object could be referred to any number of weights that may be measured for different parts of the printed object formed based on the pre-defined flow speed. It will be appreciated that the end measurement of the second weight, that is equal to or exceeds the reference weight, may be referred to as the latest weight thereof, as mentioned above. The latest weight is typically the actual weight of the printed object measured at the end of the multidimensional printing. The latest weight is compared to the expected weight determined using one or more mathematical equations by the control unit or fed to the system by the operator of the system. Moreover, the difference in the values of the latest weight and the expected weight may be used to calibrate the system, such as for changing at least one of: the pre-defined density, the pre-defined volume, the pre-defined flow speed, the pre-defined cross-sectional area. In this case, flow meter is used to determine an expected weight of the printed object using different printing parameters (such as the pre-defined density, the pre-defined volume, the pre-defined flow speed of the printing material and the pre-defined cross-sectional area of the printing head). The difference between the expected weight and the latest weight using scale helps in calibration of different printing parameters by the control unit.

Optionally, the control unit is further configured to:
control the printing head to extrude, based on the pre-defined flow speed, a first volume of the printing material, to produce a first part of the printed object on the printing surface, wherein the first volume is in a range between 66% and 99% of the pre-defined volume of the printing material;
obtain from the flow meter, a first flow speed of the printing material, wherein the first flow speed is measured and obtained after a pre-defined time interval while the first part of the printed object is being produced;

control the printing head to extrude, based on the pre-defined flow speed, a second volume of the printing material, to produce a second part of the printed object on the printing surface;

obtain from the flow meter, a second flow speed of the printing material, wherein the second flow speed is measured and obtained at a real-time while the second part of the printed object is being produced;

obtain, from the scale, a latest weight of the printed object;

compare the latest weight with the reference weight; and controlling the printing head to stop extrusion of the printing material when the latest weight is equal to or exceeds the reference weight.

In general, the measurements with the flow meter are read in real-time, however, the measurements could be made after the pre-defined intervals. In this regard, the measurement of the flow speed after the pre-defined interval may be performed after every 5 second, for example. Beneficially, when the flow meter is being used with the system, there is no need to stop extruding the printing material during measurements at the pre-defined intervals. Additionally, beneficially, measurement of the flow speed after the pre-defined interval prevents errors during the multidimensional printing process and saves computational power required to process a plurality of data points collected for further quality analysis purposes.

Optionally, the control unit is further configured to:

control the printing head to extrude the printing material, to produce the printed object on the printing surface;

obtain from the flow meter, an actual density of the printing material, at any of: a real-time or after a pre-defined time interval, while the printed object is being produced;

obtain, from the scale, the weight of the printed object;

calculate, based on the weight and the flow rate, an obtained density of the printed object;

compare the obtained density of the printed object with the actual density of the printing material; and when the obtained density of the printed object differs from the actual density of the printing material, change at least one of: the pre-defined density, the pre-defined volume, the pre-defined flow speed, the pre-defined cross-sectional area.

In this regard, the term "actual density" as used herein refers to the density of the extruded printing material as measured by the flow meter, such as at a real-time or after a pre-defined time interval, as it is being extruded from the printing head and depositing layer-by-layer on the printing surface to form the printed object at that instance. The actual density is compared with the obtained density of the printed object that is calculated based on the weight of the printed object as measured by using the scale and the flow rate of the printing material as measured by using the flow meter. Moreover, the difference in the values of the obtained density and the actual density may be used to calibrate the system, such as for changing at least one of: the pre-defined density, the pre-defined volume, the pre-defined flow speed, the pre-defined cross-sectional area. Optionally, the difference in the obtained density and the actual density may be due to at least one of: a high difference in temperature conditions inside the printing head and the printing area, a chemical reaction between the printing material and the environmental conditions of the printing area, and so forth.

Moreover, the difference between the obtained density and the actual density helps in calibration of different printing parameters by the control unit.

The present disclosure provides the aforementioned system and methods to compare a multidimensional printer "internal" logic and an "external" measurement. The multidimensional printer "internal" logic has the capability to measure a volume, a density and a flow speed of the printing material, and a cross-sectional area of the printing head to extrude the printing material, and make estimations for controlling the printing head to extruded the printing material by not taking into consideration errors in the multidimensional printer, such as in the printing head filters, taps, and so forth. The "external" measurement tools include the scale and the flow meter which can measure the actual (or real) values of the volume, the density and the flow speed of the printing material, and the cross-sectional area of the printing head to extrude the printing material. Moreover, the "external" measurement tools, such as the flow meter, is used to measure the actual flow speed of the printing material, thereby, giving an accurate value that may be used to control the printing head to extrude the printing material, and use it for one-time, real-time, or after the pre-defined intervals for calibration of the multidimensional printer "internal" logic.

Optionally, the printing head comprises a screw type of valve. When the screw turns by 360°, the volume of the extruded printing material is X. If the screw turns 180°, then the volume of the extruded printing material is X/2. When using the "external" flow meter, it is possible to correct the screw. Alternatively, the printing head comprises a variable/proportional pressure valve and/or a valve with a static pressure comprising simple on/off functions. Moreover, a value K is calculated "internally" based on the printing material density, mass, and volume. When an amount of volume V is needed to extrude, then the K value determines by how many degrees the screw in the printing head must be turned to get a volume V. If the "internal" and "external" values are different, then the value K is corrected such that the "internal" and "external" values are in sync and "external" measurement always overrules. It will be appreciated that if the difference is a non-zero value all the time, then the scale or the flow meter could be broken and may be required to be replaced. Optionally, the K value may be used to determine a pressure value for a variable valve and determine the valve on/off time when using a static pressure. Optionally, the valve may be an ordinary valve, a piezo valve, and so forth.

It will be appreciated that during the multidimensional printing involving for example bioprinting (manufacturing of tissues, organs, and so forth), pharma printing (manufacturing of drugs, and so forth), and the like, the one or more printing heads are disinfected before calibration. In this regard, the printing head dispensing the biomedical material is disinfected before calibration by passing the printing head through a light gate arrangement, for example. Typically, the light gate arrangement is configured to determine movement along mutually orthogonal directions, and wherein each of the light gate arrangements comprises a light source and an optical transceiver. Optionally, each of the light sources is configured to emit a disinfectant light. The light sources of each of the light gate arrangements emit a disinfectant light, such as a blue light, ultraviolet light and so forth, in order to disinfect the printing heads during calibration thereof.

Optionally, a microscope vision arrangement may be employed in the system to capture at least one image of the object being manufactured on the printing surface, wherein the microscope vision arrangement comprises: at least one optical device and at least one camera operatively coupled to the control unit. Moreover, the control unit may then instruct the microscope vision arrangement to capture at least one image from 360° around the object (such as, from a top, bottom, left, right, front and rear) of the object being manufactured in the multidimensional printer, such as after pre-defined intervals or in real-time, during the manufacturing of the printed object. Furthermore, the control unit is configured to analyze the at least one image (obtained from the microscope vision arrangement) to determine a location of a critical component (namely, a segment of the printed material) with respect to the part of the printed object already printed. Furthermore, the portion of the printed object can serve as a point of origin (or nexus) for further printing of the printed object until complete manufacturing thereof. For example, the printed object being manufactured is a tissue and a captured image of the indicates presence of a cell printed thereon. In such an example, the printed cell is the critical component for manufacturing the tissue and is taken as a point of origin for printing of a remainder of the tissue.

Optionally, the control unit is configured to employ the microscope vision arrangement to determine at least one of: a location and/or a volume of the printed object being manufactured on the printing surface. In an example, a medicinal pill comprising three different salts in pre-defined quantities, is required to be manufactured using the multidimensional printing such as the pharma printing. The amount of salts dispensed from the printing heads is required to be accurately dispensed, therefore, it is constantly monitored using the microscope vision arrangement. The information about the volume of the object, such as, the medicinal pill is recorded by the control unit in order to ensure that the medicinal pill is being accurately manufactured.

The present disclosure also relates to the method as described above. Various embodiments and variants disclosed above apply mutatis mutandis to the method.

The method comprises setting up the multidimensional printer. The term "setting up" as used herein refers to powering up the multidimensional printer. Optionally, the multidimensional printer may be powered using power from an external power source or may be operated using battery. Moreover, the method comprises defining, in the control unit, a set of parameters for performing quality analysis for multidimensional printing. Herein, defining the set of parameters refer to providing the set of parameters in a software file, for example, to the control unit. Optionally, the control unit may be trained using machine learning algorithms or artificial intelligence-based models to determine the set of parameters "internally".

Optionally, the method further comprises operating the control unit for:
controlling the axis system to move the printing head to be in contact with the printing surface, on at least one horizontal position;
obtaining, from the scale, weight values during the movement of the printing head;
comparing the weight values to a pre-defined calibration value and when a given weight value is equal to a pre-defined calibration value, a corresponding vertical position of the printing head is calibrated as a zero-vertical position for the at least one horizontal position; and
storing the zero-vertical position for the at least one horizontal position, in the memory.

Optionally, the method further comprises operating the control unit for:
selecting, using a software application, the printing material having a pre-defined density and a pre-defined volume;
controlling the printing head to extrude the printing material, to produce a test printed object on the printing surface;
obtaining, from the scale, a test weight of the test printed object;
calculating, based on the test weight and the pre-defined density, a test volume of the test printed object, and comparing the test volume with the pre-defined volume; and
when the test volume differs from the pre-defined volume, changing at least one of: the pre-defined density, the pre-defined volume.

Optionally, the method further comprises operating the control unit for:
controlling the printing head to extrude a first volume of the printing material, to produce a first part of the printed object on the printing surface;
obtaining, from the scale, a first weight of the printed object comprising the first part thereof, at a real-time;
controlling the printing head to extrude a second volume of the printing material, to produce a second part of the printed object on the printing surface;
obtaining, from the scale, a second weight of the printed object, wherein the second weight corresponds to weights of the first part and the second part, at a real-time; and
controlling the printing head to stop extrusion of the printing material when the second weight is equal to or exceeds the reference weight.

Optionally, the method further comprises operating the control unit for:
controlling the printing head to extrude a first volume of the printing material, to produce a first part of the printed object on the printing surface;
obtaining, from the scale, a first weight of the first part of the printed object, after a pre-defined interval;
controlling the printing head to extrude a second volume of the printing material, to produce a second part of the printed object on the printing surface, when the first weight is less than the reference weight;
obtaining, from the scale, a second weight of the printed object, after the pre-defined interval, wherein the second weight corresponds to weights of the first part and the second part; and
controlling the printing head to stop extrusion of the printing material when the second weight is equal to or exceeds the reference weight.

Optionally, the method further comprises operating the control unit for:
controlling the printing head to extrude a first volume of the printing material, to produce a first part of the printed object on the printing surface, wherein the first volume is in a range between 66% and 99% of the pre-defined volume of the printing material;
obtaining, from the scale, a first weight of the first part of the printed object, after a pre-defined interval;
determining whether or not the first weight is less than 95% of the reference weight;
when the first weight is less than 95% of the reference weight, controlling the printing head to extrude a second volume of the printing material, to produce a second part of the printed object on the printing surface, and obtaining, from the scale, a second weight of the printed object, after the pre-defined interval, wherein the second weight corresponds to weights of the first part and the second part;

when the first weight is at least 95% of the reference weight, controlling the printing head to extrude a second volume of the printing material, to produce a second part of the printed object on the printing surface, and obtaining, from the scale, a second weight of the printed object, in real-time, wherein the second weight corresponds to weights of the first part and the second part; and controlling the printing head to stop extrusion of the printing material when the second weight is equal to or exceeds the reference weight.

Optionally, when the weight exceeds the reference weight, the method further comprises operating the control unit for retracting, by the printing head, an excess volume of the printing material from the printed object on the printing surface, in a manner that upon retraction, the weight is equal to the reference weight.

Optionally, the method further comprises using a flow meter, communicably coupled to the control unit, for:

receiving, from the control unit, a pre-defined density of the printing material, a pre-defined volume of the printing material, a pre-defined flow speed of the printing material and a pre-defined cross-sectional area of the printing head; and measuring a flow rate of the printing material that is being extruded with the printing head, to produce the printed object on the printing surface, wherein the flow rate is measured based on the pre-defined density, the pre-defined volume, the pre-defined flow speed and the pre-defined cross-sectional area.

Optionally, the method further comprises operating the control unit for:

controlling the printing head to extrude, based on the flow rate, the printing material, to produce the printed object on the printing surface;

obtaining, from the scale, the weight of the printed object;

calculating, based on the pre-defined density and the flow rate, a mass of the printing material that is extruded;

comparing the mass with the weight; and when the weight differs from the mass, changing at least one of the pre-defined density, the pre-defined volume, the pre-defined flow speed, the pre-defined cross-sectional area.

Optionally, the method comprises operating the control unit for controlling the printing head to extrude, based on the pre-defined flow speed, the printing material, to produce the printed object on the printing surface, and obtaining, from a flow meter, an actual flow speed of the printing material, at a real-time.

Optionally, the method further comprises operating the control unit for:

controlling the printing head to extrude, based on the pre-defined flow speed, a first volume of the printing material, to produce a first part of the printed object on the printing surface;

obtaining, from the flow meter, a first flow speed of the printing material, wherein the first flow speed is measured and obtained after a pre-defined interval while the first part of the printed object is being produced;

controlling the printing head to extrude, based on the pre-defined flow speed, a second volume of the printing material, to produce a second part of the printed object on the printing surface;

obtaining, from the flow meter, a second flow speed of the printing material, wherein the second flow speed is measured and obtained after a pre-defined interval while the second part of the printed object is being produced;

obtaining, from the scale, a latest weight of the printed object;

comparing the latest weight with an expected weight; and when the latest weight differs from the expected weight, changing at least one of: the pre-defined density, the pre-defined volume, the pre-defined flow speed, the pre-defined cross-sectional area.

Optionally, the method further comprises operating the control unit for:

controlling the printing head to extrude, based on the pre-defined flow speed, a first volume of the printing material, to produce a first part of the printed object on the printing surface, wherein the first volume is in a range between 66% and 99% of the pre-defined volume of the printing material;

obtaining, from the flow meter, a first flow speed of the printing material, wherein the first flow speed is measured and obtained after a pre-defined interval while the first part of the printed object is being produced;

controlling the printing head to extrude, based on the pre-defined flow speed, a second volume of the printing material, to produce a second part of the printed object on the printing surface;

obtaining, from the flow meter, a second flow speed of the printing material, wherein the second flow speed is measured and obtained at a real-time while the second part of the printed object is being produced;

obtaining, from the scale, a latest weight of the printed object;

comparing the latest weight with the reference weight; and controlling the printing head to stop extrusion of the printing material when the latest weight is equal to or exceeds the reference weight.

Optionally, the method further comprises operating the control unit for:

controlling the printing head to extrude the printing material, to produce the printed object on the printing surface;

obtaining, from the flow meter, an actual density of the printing material, at any of: a real-time or after a pre-defined interval, while the printed object is being produced;

obtaining, from the scale, the weight of the printed object;

calculating, based on the weight and the flow rate, an obtained density of the printed object;

comparing the obtained density of the printed object with the actual density of the printing material; and when the obtained density of the printed object differs from the actual density of the printing material, changing at least one of: the pre-defined density, the pre-defined volume, the pre-defined flow speed, the pre-defined cross-sectional area.

DETAILED DESCRIPTION OF DRAWINGS

Referring to FIG. 1, illustrated is a system 100 for performing quality analysis for multidimensional printing, in accordance with an embodiment of the present disclosure. The system 100 comprises a multidimensional printer (not shown) and a control unit (not shown) operatively coupled to the multidimensional printer. The multidimensional printer comprises a printing head 102, a printing surface 104, an axis system (not shown) and a scale 106. The scale 106 is arranged to measure weight applied on the printing surface 104. The control unit is configured to control the printing head 102 to extrude a printing material 108, to produce a printed object (not shown) on the printing surface 104; obtain, from the scale 106, a weight of the printed object, and store the weight of the printed object in a memory associated with the control unit; compare the weight with a reference weight of the printed object; and control the printing head 102 to stop extrusion of the printing material 108 when the weight is equal to or exceeds the reference weight.

Moreover, the system 100 further comprises a flow meter 110 communicably coupled to the control unit. The flow meter is configured to receive, from the control unit, a pre-defined density of the printing material 108, a pre-defined volume of the printing material 108, a pre-defined flow speed of the printing material 108 and a pre-defined cross-sectional area of the printing head 102; and measure a flow rate of the printing material 108 that is being extruded with the printing head 102, to produce the printed object on the printing surface 104, wherein the flow rate is measured based on the pre-defined density, the pre-defined volume, the pre-defined flow speed and the pre-defined cross-sectional area.

Figures 2A, 2B:
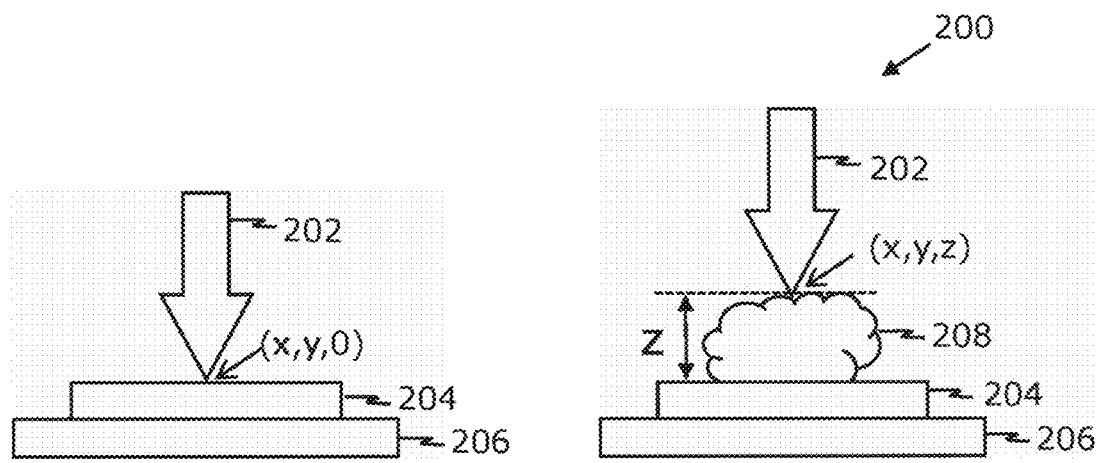
FIGS. 2A and 2B are schematic illustrations of calibration of the printing head before and during (and/or after) printing, respectively, in accordance with an embodiment of the present disclosure.

Referring to FIGS. 2A and 2B, illustrated is calibration 200 of the printing head 202 (such as the printing head 102 of FIG. 1) before and during (and/or after) printing, respectively, in accordance with an embodiment of the present disclosure. As shown in FIG. 2A, before printing, the control unit (not shown) is configured to control the axis system (not shown) to move the printing head 202 to be in contact with the printing surface 204 (such as the printing surface 104 of FIG. 1), on at least one horizontal position x,y; obtain, from the scale 206 (such as the scale 106 of FIG. 1), weight values during the movement of the printing head 202; compare the weight values to a pre-defined calibration value and when a given weight value is equal to a pre-defined calibration value, a corresponding vertical position of the printing head 202 is calibrated as a zero-vertical position z for the at least one horizontal position x,y; and store the zero-vertical position z for the at least one horizontal position x,y, in the memory as x,y,z wherein on the printing surface 204 value of z is zero.

As shown in FIG. 2B, during (and/or after), the control unit is configured to control the axis system to move the printing head 202 on the printing surface 204, on at least one horizontal position x,y, to print the printed object 208, layer by layer; obtain, from the scale 206, weight values during the movement of the printing head 202; compare the weight values to a pre-defined calibration value and when a given weight value is equal to a pre-defined calibration value, a corresponding vertical position of the printing head 202 is calibrated as a zero-vertical position z for the at least one horizontal position x,y; and store the zero-vertical position z for the at least one horizontal position x,y, in the memory as x,y,z wherein during and/or after printing of the printed object 208 value of z is non-zero.

Figure 3A:
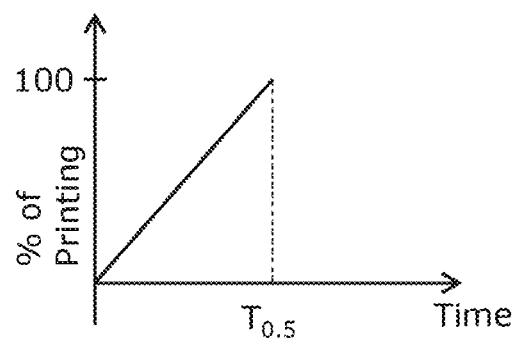
FIGS. 3A, 3B and 3C are illustrations of graphs depicting percentage of printing as a function of time during printing, in accordance with different embodiments of the present disclosure.
Figure 3B:
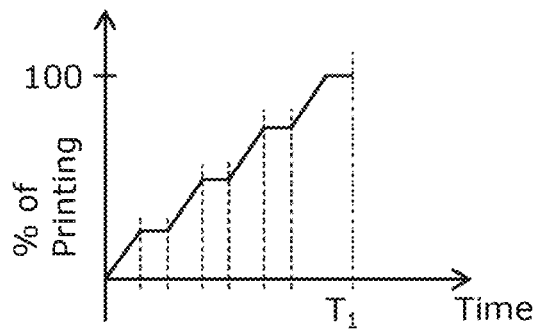
Figure 3C:
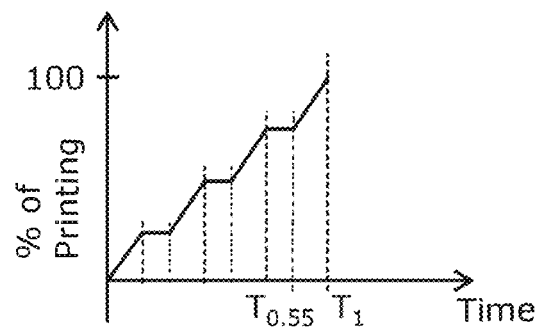

Referring to FIGS. 3A, 3B, and 3C, illustrated are graphs 300 depicting percentage of printing as a function of time during printing, in accordance with an embodiment of the present disclosure. As shown in FIG. 3A, the graph depicts percentage of printing of the printing material measured at a real-time, wherein time T0.5 is an instantaneous time at which a pre-determined percentage of the printing material is printed. For example, if 1 ml of printing material is printed in 0.5 seconds, then measurement at T0.5 will show a 100% of printing. As shown in FIG. 3B, the graph depicts percentage of printing of the printing material after a pre-defined interval, wherein time T1 is total time required for printing 100% of the printing material. For example, if 20 ml of printing material is printed in 25 seconds, then T1 is 25 seconds at which 100% of printing of the printing material (20 ml) is achieved.

As shown in FIG. 3C, the graph depicts percentage of printing of the printing material after a pre-defined interval when the weight is less than 95% of the reference weight, and subsequently, in real-time when the weight is at least 95% of the reference weight. Referring to the above example, if 20 ml of printing material is printed in 25 seconds, then T0.55 is the time interval at which 95% of printing of the printing material (20 ml) is achieved and T1 is total time for printing 100% of the printing material. The time period between the T0.55 and T1 depicts real-time measurement of the percentage of printing.

Figure 3D:
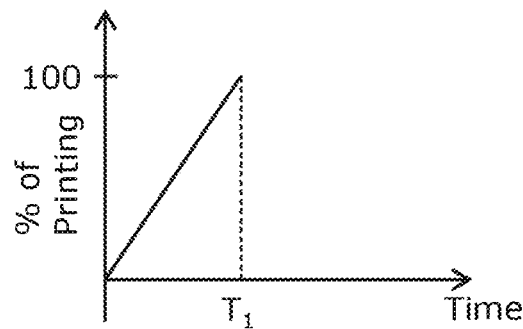
FIG. 3D is an illustration of a graph depicting percentage of printing as a function of time after printing, in accordance with an embodiment of the present disclosure.

Referring to FIG. 3D, illustrated is a graph 300 depicting percentage of printing as a function of time after printing (namely, at the end of printing), in accordance with an embodiment of the present disclosure. As shown in FIG. 3D, the graph depicts percentage of printing of the printing material at the end of the printing process, as measured in real-time. Here, time T1 is the end of printing process at which 100% of printing is measured. It will be appreciated that the percentage of printing of the printing material is correlated with the weight of the printed object that could be measured using the scale.

Figure 4:
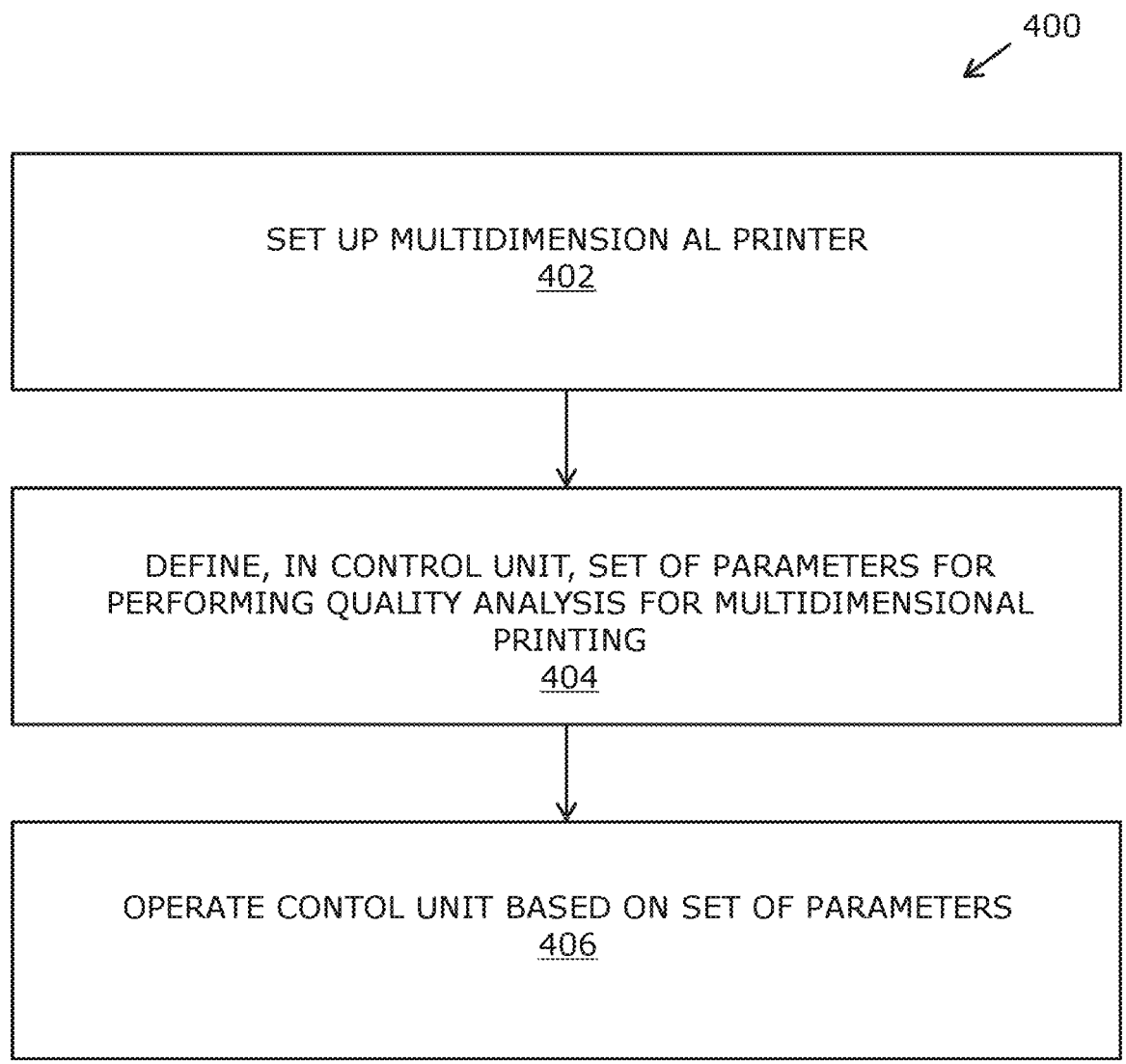
FIG. 4 is an illustration of steps of a method for performing quality analysis for multidimensional printing, in accordance with an embodiment of the present disclosure.

Referring to FIG. 4, there is shown a flowchart 400 illustrating steps of a method for performing quality analysis for multidimensional printing, in accordance with an embodiment of the present disclosure. At step 402, a multidimensional printer is set up. The multidimensional printer comprises a printing head, a printing surface, an axis system and a scale, wherein the scale is arranged to measure weight applied on the printing surface. At step 404, a set of parameters, for performing quality analysis for multidimensional printing is defined, in a control unit, wherein the control unit is operatively coupled to the multidimensional printer. At step 406, the control unit is operated based on the set of parameters, for controlling the printing head to extrude a printing material, to produce a printed object on the printing surface, obtaining, from the scale, a weight of the printed object, and storing the weight of the printed object in a memory associated with the control unit, comparing the weight with a reference weight of the printed object, and controlling the printing head to stop extrusion of the printing material when the weight is equal to or exceeds the reference weight.

The steps 402, 404 and 406 are only illustrative and other alternatives can also be provided where one or more steps are added, one or more steps are removed, or one or more steps are provided in a different sequence without departing from the scope of the claims herein.

Figure 5:
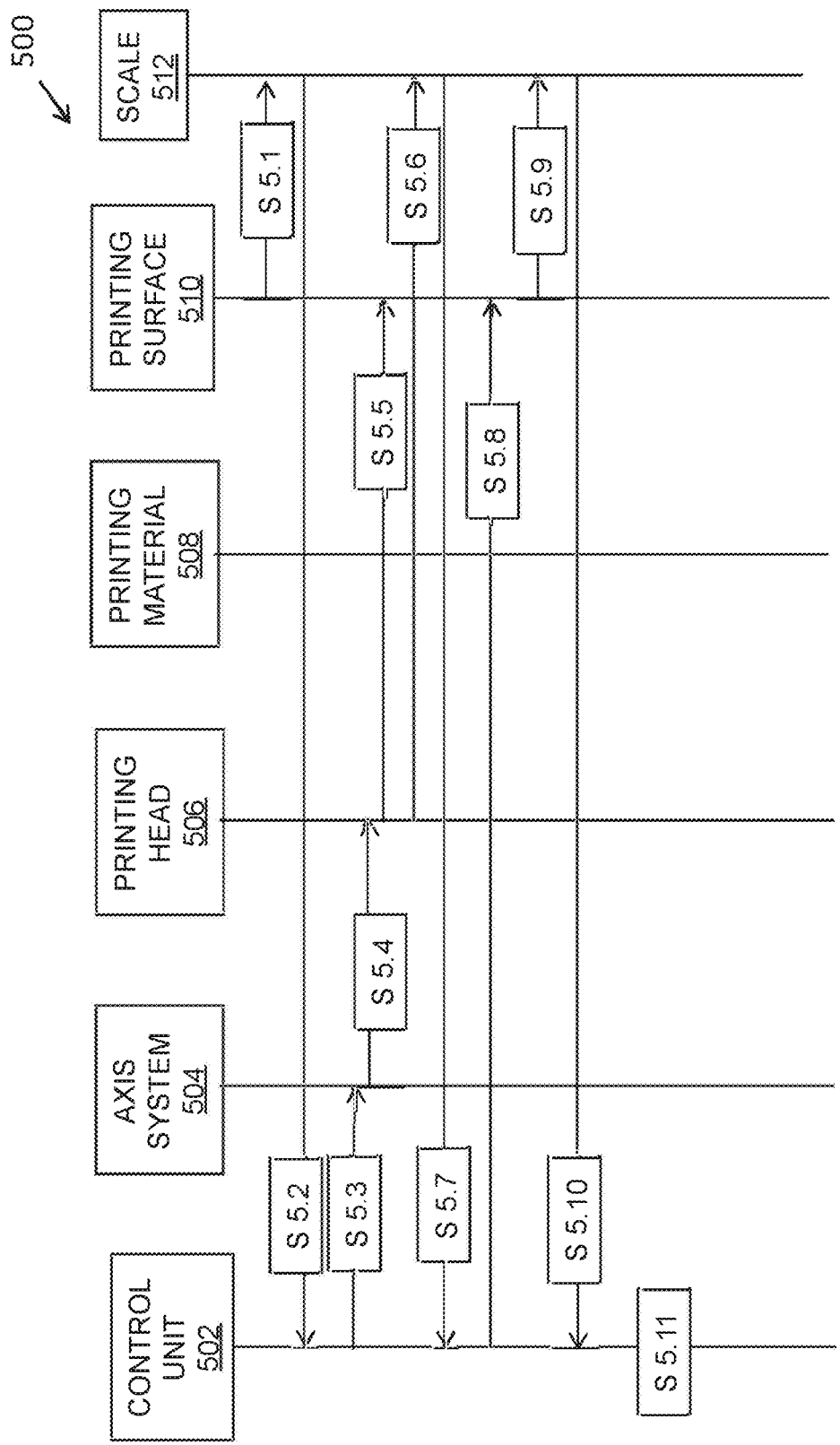
FIG. 5 is an illustration of operational steps of a system for performing quality analysis for multidimensional printing, in accordance with an embodiment of the present disclosure.

Referring to FIG. 5, illustrated are operational steps 500 of a system, such as the system 100 of FIG. 1, for performing quality analysis for multidimensional printing, in accordance with an embodiment of the present disclosure. As mentioned above, the system comprises a multidimensional printer comprising a printing head, a printing surface, an axis system and a scale, wherein the scale is arranged to measure weight applied on the printing surface; and a control unit operatively coupled to the multidimensional printer.

At step S 5.1, the printing surface 510 is weighed using the scale 512. At step S 5.2, the printing surface 510 calibrated, based on the weight thereof, by the control unit 502. At steps S 5.3, S 5.4 and S 5.5, the axis system 504 is controlled by the control unit 502 to move the printing head 506 to be in contact with the printing surface 510, on at least one horizontal position, and a corresponding vertical position of the printing head 506 is calibrated as a zero-vertical position for the at least one horizontal position. At step S 5.6, the printing head 506 is controlled using the control unit 502 to extrude a test amount of printing material 508 for printing on the printing surface 510. At step S 5.7, a weight of the printing material 508 is obtained from the scale 512 and used to calibrate, using the control unit 502, the printing material 508. It will be appreciated that steps S 5.1 to S 5.7 are typically performed before the printing process to calibrate the printing surface (S 5.1 to S 5.2), the printing head (S 5.3 to S 5.5), and the printing material (S 5.6 to S 5.7), and ensure quality of the process and the final product, i.e., the printed object.

At step S 5.8, printing material 508 is extruded with the printing head 506, to produce a printed object on the printing surface 510. At step S 5.9, weight of the printed object is obtained from the scale 512. At step S 5.10, the weight of the printed object is stored in the memory associated with the control unit 502. At step S 5.11, the weight is compared with a reference weight of the printed object, and the printing head 506 is controlled, by the control unit 502, to stop extrusion of the printing material 508 when the weight is equal to or exceeds the reference weight. It will be appreciated that steps S 5.8 to S 5.11 are typically performed during the printing process to ensure quality of the final product, i.e., the printed object.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for performing quality analysis for multidimensional printing, the method comprising:
   setting up a multidimensional printer, wherein the multidimensional printer comprises a printing head, a printing surface, an axis system and a scale, wherein the scale is arranged to measure weight applied on the printing surface;
   defining, in a control unit, a set of parameters for performing quality analysis for multidimensional printing, wherein the control unit is operatively coupled to the multidimensional printer; and
   operating the control unit, based on the set of parameters, for:
      controlling the printing head to extrude a printing material, to produce a printing object on the printing surface,
      obtaining, from a flow meter, an actual density of the printing material, at any of:
      a real-time or after a pre-defined interval, while the printing object is being produced;
      obtaining, from the scale, the weight of the printing object;
      calculating, based on the weight and a flow rate, an obtained density of the printing object;
      comparing the obtained density of the printing object with the actual density of the printing material;
      wherein the obtained density of the printing object differs from the actual density of the printing material, changing at least one of: a pre-defined density, a pre-defined volume, a pre-defined flow speed, a pre-defined cross-sectional area;
      obtaining, from the scale, a weight applied on the printing surface due to the extruding, and storing the weight applied to the printing surface in a memory associated with the control unit,
   comparing the weight with a reference weight of the printing object, and
   controlling the printing head to stop extrusion of the printing material when the weight is equal to or exceeds the reference weight.

2. The method according to claim 1, further comprising operating the control unit for:
   controlling the axis system to move the printing head to be in contact with the printing surface, on at least one horizontal position;
   obtaining, from the scale, weight values during the movement of the printing head;
   comparing the weight values to a pre-defined calibration value and when a given weight value is equal to the pre-defined calibration value, a corresponding vertical position of the printing head is calibrated as a zero-vertical position for the at least one horizontal position; and
   storing the zero-vertical position for the at least one horizontal position, in the memory.

3. The method according to claim 1, further comprising operating the control unit for:
   selecting, using a software application, the printing material having a pre-defined density and a pre-defined volume;
   controlling the printing head to extrude the printing material, to produce a test printed object on the printing surface;
   obtaining, from the scale, a test weight of the test printed object;
   calculating, based on the test weight and the pre-defined density, a test volume of the test printed object, and comparing the test volume with the pre-defined volume; and
   when the test volume differs from the pre-defined volume, changing at least one of: the pre-defined density, the pre-defined volume.

4. The method according to claim 1, further comprising operating the control unit for:
   controlling the printing head to extrude a first volume of the printing material, to produce a first part of the printing object on the printing surface;
   obtaining, from the scale, a first weight of the printing object comprising the first part thereof, at a real-time;
   controlling the printing head to extrude a second volume of the printing material, to produce a second part of the printing object on the printing surface;
   obtaining, from the scale, a second weight of the printing object, wherein the second weight corresponds to weights of the first part and the second part, at a real-time; and controlling the printing head to stop extrusion of the printing material when the second weight is equal to or exceeds the reference weight.

5. The method according to claim 1, further comprising operating the control unit for:
   controlling the printing head to extrude a first volume of the printing material, to produce a first part of the printing object on the printing surface;
   obtaining, from the scale, a first weight of the first part of the printing object, after a predefined interval;
   controlling the printing head to extrude a second volume of the printing material, to produce a second part of the printing object on the printing surface, when the first weight is less than the reference weight;
   obtaining, from the scale, a second weight of the printing object, after the pre-defined interval, wherein the second weight corresponds to weights of the first part and the second part; and
   controlling the printing head to stop extrusion of the printing material when the second weight is equal to or exceeds the reference weight.

6. The method according to claim 1, further comprising operating the control unit for:
   controlling the printing head to extrude a first volume of the printing material, to produce a first part of the printing object on the printing surface, wherein the first volume is in a range between 66% and 99% of a pre-defined volume of the printing material;
   obtaining, from the scale, a first weight of the first part of the printing object, after a predefined interval;
   determining whether or not the first weight is less than 95% of the reference weight;
   when the first weight is less than 95% of the reference weight,
   controlling the printing head to extrude a second volume of the printing material, to produce a second part of the printing object on the printing surface, and
   obtaining, from the scale, a second weight of the printing object, after the pre-defined interval, wherein the second weight corresponds to weights of the first part and the second part;
   when the first weight is at least 95% of the reference weight,
   controlling the printing head to extrude a second volume of the printing material, to produce a second part of the printing object on the printing surface, and
   obtaining, from the scale, a second weight of the printing object, in real-time, wherein the second weight corresponds to weights of the first part and the second part; and
   controlling the printing head to stop extrusion of the printing material when the second weight is equal to or exceeds the reference weight.

7. The method according to claim 1, wherein when the weight exceeds the reference weight, the method further comprises operating the control unit for retracting, by the printing head, an excess volume of the printing material from the printing object on the printing surface, in a manner that upon retraction, the weight is equal to the reference weight.

8. The method according to claim 1, further comprising operating the control unit for:
   controlling the printing head to extrude, based on the flow rate, the printing material, to produce the printing object on the printing surface;
   obtaining, from the scale, the weight of the printing object;
   calculating, based on the pre-defined density and the flow rate, a mass of the printing material that is extruded;
   comparing the mass with the weight; and
   when the weight differs from the mass, changing at least one of the pre-defined density, the pre-defined volume, the pre-defined flow speed, the pre-defined cross-sectional area.

* * * * *